United States Patent
Yang

(10) Patent No.: US 12,179,157 B2
(45) Date of Patent: Dec. 31, 2024

(54) MEMBRANES OF GLASSY POLYMER BLENDS WITH PEG-CROSSLINKED INTRINSIC MICROPOROUS POLYMERS FOR GAS SEPARATIONS

(71) Applicant: Saudi Arabian Oil Company, Dhahran (SA)

(72) Inventor: Junyan Yang, Acton, MA (US)

(73) Assignee: Saudi Arabian Oil Company, Dhahran (SA)

( * ) Notice: Subject to any disclaimer, the term of this patent is extended or adjusted under 35 U.S.C. 154(b) by 548 days.

(21) Appl. No.: 17/513,510

(22) Filed: Oct. 28, 2021

(65) Prior Publication Data

US 2023/0133081 A1 May 4, 2023

(51) Int. Cl.
| | |
|---|---|
| *B01D 53/22* | (2006.01) |
| *B01D 67/00* | (2006.01) |
| *B01D 69/02* | (2006.01) |
| *B01D 71/64* | (2006.01) |
| *C08J 3/00* | (2006.01) |
| *C08L 79/08* | (2006.01) |

(52) U.S. Cl.
CPC ........... *B01D 71/64* (2013.01); *B01D 53/228* (2013.01); *B01D 67/0006* (2013.01); *B01D 69/02* (2013.01); *C08J 3/005* (2013.01); *C08L 79/08* (2013.01); *B01D 2325/34* (2013.01); *C08J 2379/08* (2013.01); *C08J 2471/02* (2013.01); *C08J 2479/08* (2013.01); *C08L 2205/025* (2013.01); *C08L 2205/03* (2013.01); *C08L 2205/05* (2013.01)

(58) Field of Classification Search
CPC .... B01D 69/02; B01D 67/0006; B01D 71/64; B01D 53/228; B01D 2325/34; C08L 2205/05; C08L 2205/025; C08L 2205/03; C08L 79/08; C08J 2379/08; C08J 2479/08; C08J 2471/02; C08J 3/005
See application file for complete search history.

(56) References Cited

U.S. PATENT DOCUMENTS

| | | | | | |
|---|---|---|---|---|---|
| 4,254,197 | A | * | 3/1981 | Miura | .................... G03F 7/0085 430/196 |
| 4,468,447 | A | * | 8/1984 | Kanai | ..................... G03F 7/008 430/910 |
| 4,788,127 | A | * | 11/1988 | Bailey | ................... G03F 7/0758 430/167 |

(Continued)

FOREIGN PATENT DOCUMENTS

| WO | WO-2019006045 A1 * | 1/2019 |
|---|---|---|
| WO | WO 2019090140 | 5/2019 |

OTHER PUBLICATIONS

Kraftschik "Cross-linkable polyimide membranes for improved plasticization resistance and permselectivity in sour gas separations" Macromolecules 2013, 46, 6908-6921 (Year: 2013).*

(Continued)

*Primary Examiner* — Anthony R Shumate
(74) *Attorney, Agent, or Firm* — Fish & Richardson P.C.

(57) ABSTRACT

This disclosure relates to blended polymeric membranes containing a polyimide polymeric matrix blended with a crosslinked polymer of intrinsic microporosity and methods of using the membranes for gas separation applications, such as removal of $CO_2$ from natural gas.

14 Claims, 14 Drawing Sheets

(56) References Cited

U.S. PATENT DOCUMENTS

| | | | | |
|---|---|---|---|---|
| 4,830,953 | A * | 5/1989 | Bateman | G03F 7/0125 |
| | | | | 522/136 |
| 5,114,826 | A * | 5/1992 | Kwong | G03F 7/0758 |
| | | | | 522/39 |
| 7,410,525 | B1 | 8/2008 | Liu et al. | |
| 7,758,751 | B1 | 7/2010 | Liu et al. | |
| 7,998,246 | B2 | 8/2011 | Liu et al. | |
| 8,561,812 | B2 | 10/2013 | Liu et al. | |
| 8,623,928 | B2 | 1/2014 | Du et al. | |
| 9,238,202 | B2 | 1/2016 | Liskey et al. | |
| 9,452,392 | B2 | 9/2016 | Sano et al. | |
| 10,363,546 | B2 | 7/2019 | Song et al. | |
| 11,834,619 | B1 * | 12/2023 | Liu | B01D 69/1411 |
| 2002/0110651 | A1 * | 8/2002 | Suzushi | G02B 5/3016 |
| | | | | 252/299.01 |
| 2003/0068583 | A1 * | 4/2003 | Okunaka | H10K 85/146 |
| | | | | 430/319 |
| 2008/0149561 | A1 | 6/2008 | Chu et al. | |
| 2015/0165383 | A1 | 6/2015 | Liskey et al. | |
| 2016/0250585 | A1 | 9/2016 | Odeh et al. | |
| 2016/0263532 | A1 | 9/2016 | Odeh et al. | |
| 2017/0252720 | A1 | 9/2017 | Odeh et al. | |
| 2019/0070566 | A1 | 3/2019 | Kidambi et al. | |
| 2019/0321787 | A1 | 10/2019 | Sivaniah et al. | |
| 2020/0095423 | A1 | 3/2020 | Pinnau et al. | |
| 2020/0266378 | A1 * | 8/2020 | Iijima | C09D 165/00 |
| 2020/0277441 | A1 | 9/2020 | Stoddart et al. | |
| 2020/0308341 | A1 | 10/2020 | Yan et al. | |
| 2022/0213399 | A1 * | 7/2022 | Sundell | B01D 67/009 |

OTHER PUBLICATIONS

Sánchez-Laínez "Polymer engineering by blending PIM-1 and 6FDA-DAM for ZIF-8 containing mixed matrix membranes applied to CO2 separations" Separation and Purification Technology, vol. 224, 2019, pp. 456-462, (Year: 2019).*

Jain et al., "6FDA-DAM:DABA Co-Polyimide Mixed Matrix Membranes with GO and ZIF-8 Mixtures for Effective CO2/CH4 Separation," Nanomaterials, Mar. 2021, 11(3):668, 16 pages.

SAIP Examination Report in Saudi Arabian Appln No. 122440435, dated Jan. 7, 2024, 16 pages (with English translation).

U.S. Appl. No. 17/140,393, Yang, filed Jan. 4, 2021.

U.S. Appl. No. 17/140,395, Yang, filed Jan. 4, 2021.

Amici et al., "UV Processing and Characterization of polyhedral oligomeric silsesquioxane (POSS) nanocomposites", European Society for Composite Materials 2004, 10 pages.

Baumann et al., "Synthesis and characterization of novel PDMS Nanocomposites Using POSS Derivatives as Cross-Linking Filler," Journal of Polymer Science Part A Polymer Chemistry, 47:10, May 2009, 2589-2596, 8 pages.

Belcher et al., "Novel low-temperature POSS-containing siloxane elastomers", NASA Technical Reports, 2008, 11 pages.

Chen et al., "Synergistic effect between POSS and fumed silica on thermal stabilities and mechanical properties of room temperature vulcanized (RTV) silicone rubbers," Polymer Degradation and Stability, 97:3, 2012, 303-315, 8 pages.

Chen et al., "Synthesis and characterization of novel room temperature vulcanized (RTV) silicon rubbers using octa[(trimethoxysily1)ethyl]-POSS as cross-linker," Reactive and Functional Polymers, 71(4):, 2011, 502-511, 11 pages.

Chua et al., "Polyetheramine—polyhedral oligomeric silsesquioxane organic—inorganic hybrid membranes for CO2/H2 and CO2/N2 separation", Journal of Membrane Science, 385-386, 2011, 40-48, 9 pages.

Du et al., "Azide-based Cross-Linking of Polymers of Intrinsic Microporosity (PIMs) for Condensable Gas Separation," Macromolecular Rapid Communications, 32, 631-636, 2011.

Du et al., "Polymers of intrinsic microporosity containing trifluoromethyl and phenylsulfone groups as materials for membrane gas separation." Macromolecules 41.24, 2008, 9656-9662, 7 pages.

Ghanem et al., "High-Performance Membranes from Polyimides with Intrinsic Microporosity," Adv. Mater. (2008) 20:2766-2771.

Guerrero et al., "Investigation of amino and amidino functionalized Polyhedral Oligomeric Silsesquioxane (POSS®) nanoparticles in PVA-based hybrid membranes for CO2/N2 separation", Journal of Membrane Science, 544, 2017, 161-173, 13 pages.

Hao et al., "PIM-1 as an organic filler to enhance the gas separation performance of Ultem polyetherimide," Journal of Membrane Science, 453: Mar. 2014, 614-623, 10 pages.

Hasik et al., "Polysiloxane—POSS systems as precursors to SiCO ceramics," Reactive and Functional Polymers, 73:5, May 2013, 779-788, 10 pages.

Hosseini et al., "Carbon membranes from blends of PBI and polyimides for N2/CH4 and CO2/CH4 separation and hydrogen purification," Journal of Membrane Science 328, 174-185, 2009.

Hou et al., "PIM-1 as an organic filler to enhance CO2 separation performance of poly (arylene fluorene ether ketone)," Separation and Purification Technology, 242:116766, Jul. 2020, 9 pages.

Houben et al., "Plasticization behavior of crown-ether containing polyimide membranes for the separation of CO2," Separation and Purification Technology, 2021, 255:117307, 10 pages.

Isayeva et al., "Amphiphilic membranes crosslinked and reinforced by POSS," Journal of Polymer Science Part A: Polymer Chemistry, 42:17, Sep. 2004, 4337-4352, 16 pages.

Iyer et al., "Gas transport properties of polyimide-POSS nanocomposites", Journal of Membrane Science, 358, 2010, 26-32, 7 pages.

Khan et al., "Cross-Linking of Polymer of Intrinsic Microporosity (PIM-1) via Nitrene Reaction and Its Effect on Gas Transport Property," Eur. Polym. J., 49, 4157-4166, 2013.

Khan et al., "SPEEK/Matrimid blend membranes for CO2 separation," Journal of Membrane Science, 380, 55-62, 2011.

Kim et al., "Development of CO2-Selective Polyimide-Based Gas Separation Membranes Using Crown Ether and Polydimethylsiloxane," Polymers, 2021, 13:1927, 15 pages.

Kinoshita et al., "Enhanced PIM-1 membrane gas separation selectivity through efficient dispersion of functionalized POSS fillers", Journal of Membrane Science, 539, 2017, 178-186, 9 pages.

Konnertz et al., "Molecular mobility and gas transport properties of nanocomposites based on PIM-1 and polyhedral oligomeric phenethylsilsesquioxane (POSS)", Journal of Membrane Science, 529, 2017, 274-285, 43 pages.

Li et al., "UV-Rearranged PIM-1 Polymeric Membranes for Advanced Hydrogen Purification and Production," Adv. Energy Mater., 2, 1456-1466, 2012.

Li et al., "Effects of amino functionalized polyhedraloligomeric silsesquioxanes on cross-linked poly (ethylene oxide) membranes for highly-efficient CO2separation", Chemical Engineering Research & Design., 122, 2017, 280-288, 9 pages.

Li et al., "High-Performance Thermally Self-Cross-Linked Polymer of Intrinsic Microporosity (PIM-1) Membranes for Energy Development", Macromolecules, 45, 2012, 1427-1437, 11 pages.

Li et al., "Molecular-level mixed matrix membranes comprising Pebax and POSS for hydrogen purification via preferential CO2 removal", International J. Hydrogen Energy, 35, 2010, 10560-10568, 9 pages.

Liao et al., "Blending of compatible polymer of intrinsic microporosity (PIM-1) with Tröger's Base polymer for gas separation membranes," Journal of Membrane Science 566, 77- 86, 2018.

Liu et al., "Synthesis and application of PDMS/OP-POSS membrane for the pervaporative recovery of n-butyl acetate and ethyl acetate from aqueous media." Journal of Membrane Science 591, Dec. 2019, 16 pages.

Liu et al., "Preparation and thermal degradation behavior of room temperature vulcanized silicone rubber-g-polyhedral oligomeric silsesquioxane," Polymer, 54:22, Oct. 2013, 6140-6149, 10 pages.

Madaeni et al., "Preparation and characterization of polyimide and polyethersulfone blend membrane for gas separation," Asia-Pac. J. Chem. Eng., 7, 747-754, 2012.

Madhavan et al., "Structure—gas transport property relationships of poly (dimethylsiloxane-urethane) nanocomposite membranes," Journal of Membrane Science, 342:1-2, Oct. 2009, 291-299, 9 pages.

(56) References Cited

OTHER PUBLICATIONS

Mohamed et al., "Functional Polyimide/Polyhedral Oligomeric Silsesquioxane Nanocomposites", Polymer, 11, 26, 2019, 17 pages.
Pan et al., "Synthesis and characterization of fillers of controlled structure based on polyhedral oligomeric silsesquioxane cages and their use in reinforcing siloxane elastomers", J. Polym. Sci.: Part B: Polym. Phys., 41:24, 2003, 3314-3323, 10 pages.
Panapitiya et al., "Gas Separation Membranes Derived from High-Performance Immiscible Polymer Blends Compatibilized with Small Molecules," ACS Appl. Mater. Interfaces, 18618-18627, 2015.
Przadka et al., "Multimethacryloxy-POSS as a crosslinker for hydrogel materials", European Polymer Journal, 72, 2015, 34-49, 16 pages.
Raftopoulos et al., "Segmental dynamics in hybrid polymer/POSS nanomaterials," Progress in Polymer Science, 52:, 2016, 136-187, 52 pages.
Rahman et al., "Functionalization of POSS nanoparticles and fabrication of block copolymer nanocomposite membranes for CO2 separation", Reactive & Functional Polymer, 86, 2015, 125-133, 33 pages.
Rahman et al., "PEBAX® with PEG functionalized POSS as nanocomposite membranes for CO2 separation", Journal of Membrane Science, 437, 2013, 286-297, 66 pages.
Rahman et al., "PEG functionalized POSS incorporated Pebax nanocomposite membranes", Procedia Engineering, 44, 2012, 1523-1526, 4 pages.
Rao et al., "Preparation and oxygen/nitrogen permeability of PDMS crosslinked membrane and PDMS/tetraethoxysilicone hybrid membrane", J. Membr. Sci. 303, 2007, 132-139, 8 pages.
Rezakazemi et al., "Synthesis and gas transport properties of crosslinked poly(dimethylsiloxane) nanocomposite membranes using octatrimethylsiloxy POSS nanoparticles", Journal of Natural Gas Science & Engineering, 30, 2016, 10-18, 37 pages.
Robeson, "The Upper Bound Revisited," Journal of Membrane Science, Jul. 2008, 320:390-400, 11 pages.
Salehian et al., "Development of high performance carboxylated PIM-1/P84 blend membranes for pervaporation dehydration of isopropanol and CO2/CH4 separation," Journal of Membrane Science, 518: Nov. 2016, 110-119, 10 pages.
Sánchez-Laínez et al., "Polymer engineering by blending PIM-1 and 6FDA-DAM for ZIF-8 containing mixed matrix membranes applied to CO2 separations," Separation and Purification Technology, 224: Oct. 2019, 456-462, 7 pages.
Song et al., "Controlled thermal oxidative crosslinking of polymers of intrinsic microporosity towards tunable molecular sieve membranes", Nature Communication 5.1, 2014, 12 pages.
Soto et al., "Self-assembly of a supramolecular network with pseudo-rotaxane cross-linking nodes and its transformation into a mechanically locked structure by rotaxane formation," Chemical Communications, 2016, 52:14149, 5 pages.
Wei et al., "POSS-based hybrid porous materials with exceptional hydrogen uptake at low pressure", Microporous & Mesoporous Materials, 193, 2014, 35-39, 5 pages.
Wu et al., "A Crown Ether-Containing Copolyimide Membrane with Improved Free Volume for CO2 Separation," Industrial & Engineering Chemical Research, 2019, 58:14357-14367, 44 pages.
Yang et al., "Thermal stability enhancement mechanism of poly(dimethylsiloxane) composite by incorporating octavinyl polyhedral oligomeric silsesquioxane," Polymer Degradation and Stability, 98:1, Jan. 2013, 109-114, 6 pages.
Yong et al., "Molecular engineering of PIM-1/Matrimid blend membranes for gas separation," Journal of Membrane Science, Jul. 2012, 407-408, 45-57, 11 pages.
Yong et al., "Molecular interaction, gas transport properties and plasticization behavior of cPIM-1/Torlon blend membranes," Journal of Membrane Science, 462: Jul. 2014, 119-130, 12 pages.
Zhan et al., "Enhanced pervaporation performance of PDMS membranes based on nanosized Octa[(trimethoxysily1)ethyl]-POSS as macro-crosslinker," Applied Surface Science, 473:, Apr. 2019, 785-798, 37 pages.
Zhang et al., "Dibenzo-21-crown-7-ether contained 6FDA-based polyimide membrane with improved gas selectivity," Separation and Purification Technology, 2021, 264:118454, 13 pages.
Zhang et al., "Effect of polyhedral oligomeric silsesquioxane (POSS) on crystallization behaviors of POSS/polydimethylsiloxane rubber nanocomposites," Royal Society of Chemistry, RSC Advances, 4:, 2014, 6275-6283, 9 pages.
Zhang et al., "Polymer/polyhedral oligomeric silsesquioxane (POSS) nanocomposites: An overview of fire retardance", Progress in Polymer Science, 67, 2017, 77-125, 49 pages.
Zhao et al., "Blending of compatible polymer of intrinsic microporosity (PIM-1) with Tröger's Base polymer for gas separation membranes," Journal of Membrane Science, 566: Nov. 2018, 77-86, 34 pages.

\* cited by examiner

MEMBRANES OF GLASSY POLYMER BLENDS WITH PEG-CROSSLINKED INTRINSIC MICROPOROUS POLYMERS FOR GAS SEPARATIONS

TECHNICAL FIELD

This document relates to blended polymeric membranes containing a polyimide polymeric matrix blended with a crosslinked polymer of intrinsic microporosity (PIM) that have enhanced properties as compared to membranes that do not contain the crosslinked PIM. The document also relates to methods of using the membranes for gas separation applications, such as removal of $CO_2$ from natural gas.

BACKGROUND

Natural gas supplies 22% of the energy used worldwide and makes up nearly a quarter of electricity generation, and also plays a crucial role as a feedstock for industry. Raw natural gas is formed primarily of methane ($CH_4$); however, it also contains significant amounts of other components, such as acid gases (for example, $CO_2$ and $H_2S$). The bulk removal of these gases will not only bring about huge savings in operation costs and in capital investments in post-treatment units, but will also make these units more tolerable to significant deviations in treatment loads (feed gas quality and flow), which is a challenge for gas processing in the plants.

A widely applied technology used for the removal of acid gas from gas mixtures is amine absorption; however, there are major drawbacks associated with this technology, as it is very energy-intensive, has high capital cost and heavy maintenance requirements.

Another technology that has gained greater industrial application is the use of polymeric membrane-based technology for gas separation applications such as natural gas sweetening, oxygen enrichment, hydrogen purification, and nitrogen and organic compounds removal from natural gas. Though this technology has high energy efficiency, a small footprint (ease of processability into different configurations), and low capital cost, there exists a trade-off behavior between productivity (permeability) and efficiency (selectivity). Polyimide membranes, such as those that contain glassy polymeric materials such as 6FDA, constitute a large portion of the membrane market in gas separation. However, industrial applications of polyimide membranes are still limited for bulk removal of aggressive acid gases from natural gas due to low permeability and high $CO_2$ plasticization.

Blended polymer membranes have been prepared in the hopes of increasing the transport properties of the membranes, but most suffer from a trade-off between selectivity and permeability as well as increased plasticization. See, for example, J. Membr. Sci. (2012) 407-408:47-57; J. Membr. Sci. (2014) 453:614-623; J. Membr. Sci. (2014) 462:119-130; Sep. Purif. Technol. (2020) 242:116766; J. Membr. Sci. (2016) 518:110-119; J. Membr. Sci. (2018) 566:77-86; Sep. Purif. Technol. (2019) 224:456-462; and U.S. Pat. No. 7,410,525. Others have been found to be difficult to apply in commercial membrane manufacturing process, such as those that require large scale membrane production. See, for example, Adv. Energy Mater. (2012) 2:1456-1466; Nat. Commun. (2014) 5:4813; Macromolecules (2012) 45:1427-1437; Macromol. Rapid Commun. (2011) 32:631-636; Eur. Polym. J. (2013) 49:4157-4166; and U.S. Pat. No. 9,238,202).

Therefore, there is a need for new high flux and gas-pair selective membranes for removing $CO_2$ from natural gas that can be used under industrial conditions and actual field environments and testing conditions, such as a membrane that has a combination of high permeability and high selectivity. There is also a need for a membrane that also reduces membrane plasticization. There is also a need for a method of removing acid gases from gas mixtures using membranes that have improved permeability and selectivity as well enhanced plasticization resistance.

SUMMARY

Provided in the present disclosure are blended polymeric membranes and methods of preparing the membranes and using the membranes for gas separation applications, such as removal of $CO_2$ from natural gas.

Thus, provided in the present disclosure is a blended polymeric membrane, the membrane containing a co-polyimide polymeric membrane matrix; a polymer of intrinsic microporosity (PIM); and a polyethylene glycol-bisazide (PEG-bisazide) crosslinking agent having an average molecular weight (Mn) of about 200 to about 40,000, wherein the PIM is crosslinked with the PEG-bisazide crosslinking agent. In some embodiments, the crosslinked PIM is blended with the co-polyimide polymeric membrane matrix.

In some embodiments, the co-polyimide polymeric membrane matrix contains a 4,4'-(hexafluoroisopropylidene) diphthalic anhydride (6FDA)-based polyimide. In some embodiments, the 6FDA-based polyimide has an average molecular weight (Mn) of about 150,000 to about 230,000. In some embodiments, the 6FDA-based polyimide is 6FDA-DAM:DABA. In some embodiments, the 6FDA-based polyimide is 6FDA-DAM:DABA (3:2).

In some embodiments of the membrane, the PIM is PIM-1. In some embodiments, the PIM has an average molecular weight (Mn) of about 70,000 to about 100,000.

In some embodiments of the membrane, the PEG-bisazide crosslinking agent has an average molecular weight (Mn) of about 600 to about 2,000. In some embodiments, the PEG-bisazide crosslinking agent has an average molecular weight (Mn) of about 1100.

Also provided in the present disclosure is a method of preparing a blended polymeric membrane. In some embodiments, the method includes providing a crosslinkable PIM solution comprising a PIM and a PEG-bisazide crosslinking agent; combining the crosslinkable PIM solution with a co-polyimide solution to form a co-polyimide/uncrosslinked PIM solution; drying the co-polyimide/uncrosslinked PIM solution to form a co-polyimide/uncrosslinked PIM blended membrane; and thermally treating the co-polyimide/uncrosslinked PIM blended membrane to form a co-polyimide/crosslinked PIM blended membrane.

In some embodiments of the method, thermally treating the membrane allows for crosslinking of the PIM and the PEG-bisazide. In some embodiments, the crosslinking is via nitrene reaction.

In some embodiments of the method, the PIM is PIM-1.

In some embodiments, of the method, the PEG-bisazide crosslinking agent has an average molecular weight (Mn) of about 600 to about 2,000. In some embodiments, the PEG-bisazide has an average molecular weight (Mn) of about 1100.

In some embodiments of the method, the co-polyimide is a 6FDA-based co-polyimide. In some embodiments, the 6FDA-based co-polyimide is 6FDA-DAM:DABA. In some embodiments, the 6FDA-based co-polyimide is 6FDA-DAM:DABA (3:2).

In some embodiments of the method, the co-polyimide/crosslinked PIM blended membrane is 6FDA-DAM:DABA/XLPIM-1 (crosslinked).

Thus, also provided is a blended polymeric membrane prepared according to the methods of the present disclosure.

In some embodiments, the blended polymeric membrane demonstrates enhanced $CO_2$ plasticization resistance up to 800 psi $CO_2$ feed pressure as compared to the same polyimide-based membrane that does not incorporate a PIM crosslinked with a $CO_2$-philic bisazide-based PEG crosslinker.

In some embodiments, the blended polymeric membrane exhibits a $CO_2$-permeability increase of about 10% to about 100% as compared to the same polyimide-based membrane that does not incorporate a PIM crosslinked with a $CO_2$-philic bisazide-based PEG crosslinker.

In some embodiments, the blended polymeric membrane exhibits a $CO_2/CH_4$ selectivity increase of about 10% to about 100% as compared to the same polyimide-based membrane that does not incorporate a PIM crosslinked with a $CO_2$-philic bisazide-based PEG crosslinker.

In some embodiments, the blended polymeric membrane exhibits a $CO_2/CH_4$ single gas selectivity ($\alpha CO_2/CH_4$) of about 50 to about 60 when tested at feed temperature of 25° C. and feed pressure of 800 psi.

DETAILED DESCRIPTION

Figure 1:
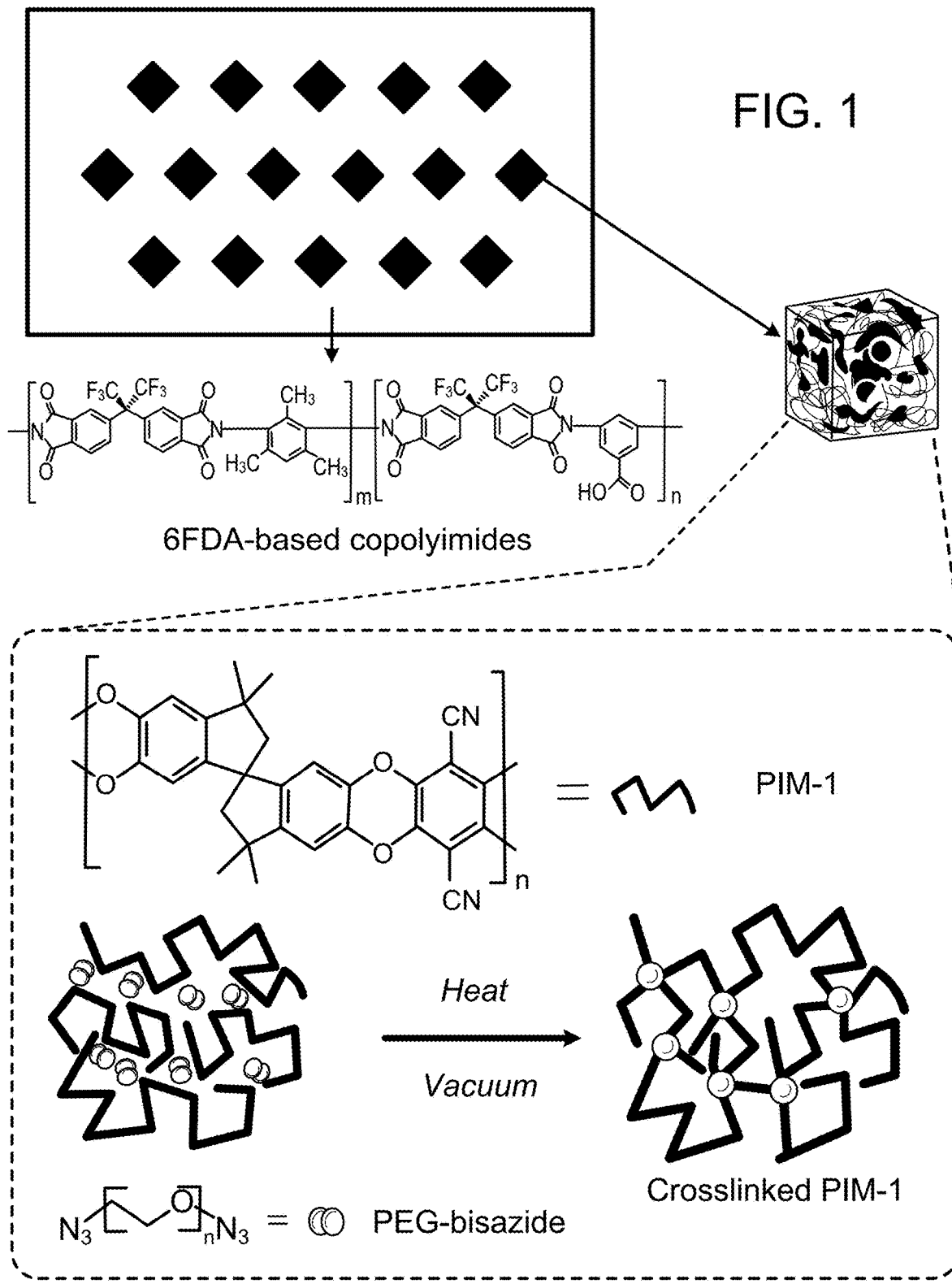
FIG. 1 is an exemplary schematic illustration of polymer blended membrane fabrication by incorporating PIM-1 and PEG-bisazide precursor in a copolyimide membrane matrix via nitrene reaction in high temperature vacuum oven.

The present disclosure relates to membranes that can be used for industrial gas processing, having a combination of high permeability and high selectivity, while at the same time reducing membrane plasticization. The present disclosure relates to blended polymeric membranes comprising a highly permeable crosslinked microporous polymer and methods for making and using the blended polymeric membranes for sour gas separation applications. In some embodiments, the blended polymeric membranes contain a 6FDA co-polyimide base moiety and an intrinsic high-free volume microporous PIM-1 polymer that is thermally crosslinked with a high molecular weight (for example, greater than 1000 Mn) $CO_2$-philic, polyethylene glycol-bisazide (PEG-bisazide) precursor via nitrene reaction at high temperature during membrane processing. The membranes of the present disclosure demonstrate significant improvement in membrane separation performance and enhanced plasticization resistance at feed pressure up to about 800 psi as compared to neat 6FDA-based polyimide membranes.

In some embodiments, incorporation of the $CO_2$-philic bisazide-based PEG crosslinker into the polymer blended membranes improves the gas transport properties in natural gas separation. In some embodiments, the thermal crosslinking of the $CO_2$-philic bisazide-based PEG crosslinker with a polymer microporosity intrinsic (for example, PIM-1) and blending with a glassy polymer (such as a polyimide)

produces a blended polymeric membrane that displays high flux and high selectivity for $CO_2/CH_4$. In some embodiments, the thermal crosslinking of the $CO_2$-philic bisazide-based PEG crosslinker with a polymer microporosity intrinsic (for example, PIM-1) and blending with a glassy polymer (such as a polyimide) produces a blended polymeric membrane that displays high plasticization resistance (for example, no plasticization observed up to about 800 psi $CO_2$ feed pressure).

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

In this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about" as used herein can allow for a degree of variability in a value or range, for example, within 10%, within 5%, or within 1% of a stated value or of a stated limit of a range.

In the methods described in the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Blended Polymeric Membranes

The blended polymeric membranes of the present disclosure contain a blend of one or more polymers. In some embodiments, the blended polymeric membranes contain a polyimide polymeric membrane matrix, such as a co-polyimide membrane matrix, a polymer of intrinsic microporosity (PIM), and a high molecular weight polyethylene glycol-bisazide (PEG-bisazide) crosslinking agent, such as a PEG-bisazide having an average molecular weight (Mn) of about 1000 to about 10,000. In some embodiments, the PIM is crosslinked with the PEG-bisazide crosslinking agent to produce a crosslinked PIM. In some embodiments, the PIM is thermally crosslinked with the PEG-bisazide crosslinking agent. In some embodiments, the crosslinked PIM is blended with the polyimide membrane matrix to produce a blended polymeric membrane.

The blended polymeric membranes of the present disclosure that incorporate the crosslinked PIM exhibit improved gas transport properties in natural gas separation as compared to the same polymeric membrane that does not include the crosslinked PIM. In some embodiments, the blended polymeric membranes of the present disclosure that incorporate the crosslinked PIM display high flux and high selectivity for $CO_2/CH_4$ as compared to the same polymeric membrane that does not include the crosslinked PIM. In some embodiments, the blended polymeric membranes of the present disclosure that incorporate the crosslinked PIM display high plasticization resistance as compared to the same polymeric membrane that does not include the crosslinked PIM. In some embodiments, the blended polymeric membranes of the present disclosure that incorporate the crosslinked PIM display high permeability and high selectivity, while at the same time reducing membrane plasticization.

Polyimide Polymeric Membrane Matrix

The blended polymeric membranes of the present disclosure contain a polyimide polymeric membrane matrix. A polyimide polymer of the present disclosure includes any polyimide, such as polyimides synthesized by a poly-condensation reaction involving the reaction of one or more aromatic dianhydrides (or derivatives thereof suitable for synthesizing polyimides) with at least one or more types of diamines (for example, aromatic diamines and aliphatic diamines, or derivatives thereof suitable for synthesizing polyimides), polyimide esters, and polyimide ether esters. In some embodiments, the polyimide polymer is a glassy polymer. In some embodiments, the polyimide polymer is a co-polyimide polymer.

In some embodiments, the aromatic dianhydride is 4,4'-(hexafluoroisopropylidene) diphthalic anhydride (6FDA). In some embodiments, the polyimide polymer comprises 6FDA. In some embodiments, the polyimide polymer is a 6FDA-based polymer.

The aromatic dianhydride, for example, 6FDA, can be polycondensed with one or more of any suitable diamine, polyimide ester, polyimide ether ester, or combinations thereof. In some embodiments, 6FDA is condensed with one or more of a diamine, polyimide ester, polyimide ether ester, or combination thereof to form a 6FDA-based polyimide. In some embodiments, the 6FDA-based polyimide is a co-polyimide. In some embodiments, the aromatic dianhydride, for example, 6FDA, is condensed with an aromatic diamine selected from the group consisting of 2,4,6-trimethyl-1,3-diaminobenzene (DAM), 3,5-diaminobenzoic acid (DABA), 1,4-phenylenediamine (pPDA), 1,3-phenylenediamine (mPDA), 2,3,5,6-tetramethyl-1,4-phenylenediamine (durene), 2,4,5,6-tetrafluoro-1,3-phenylenediamine, 2,3,5,6-tetrafluoro-1,4-phenylenediamine, and 3,5-diaminobenzoic acid, and combinations thereof. In some embodiments, 6FDA is condensed with DAM, DABA, or a combination thereof. In some embodiments, 6FDA is condensed with DAM and DABA to form a co-polyimide polymer.

In some embodiments, the 6FDA-based polyimide is selected from the group consisting of poly(2,4,6-trimethyl-1,3-phenylene-4,4'-(hexafluoroisopropylidene)diphthalimide) (6FDA-DAM), poly(1,3-phenylene-4,4'-hexafluoroisopropylidene)diphthalimide (6FDA-mPDA), poly(3,5-benzoic acid-4,4'-(hexafluoroisopropylidene)diphthalimide (6FDA-DABA), poly(diethyltoluene-4,4'-(hexafluoroisopropylidene)diphthalimide (6FDA-DETDA), poly(2,4,6-trimethyl-1,3-phenylene-(4,4'-(hexafluoroisopropylidene)diphthalimide-co-2,4,6-trimethyl-1,3-phenylene-4,4'-bipthalimide (6FDA:BPDA-DAM (1:1)), poly(1,5-naphthalene-4,4'-(hexafluoroisopropylidene)diphthalimide-co-4,4'-diphenylether-4,4'-(hexafluoroisopropylidene)diphthalimide (6FDA-1,5-ND:ODA (1:1)), poly(diethyltoluene-4,4'-(hexafluoroisopropylidene)diphthalimide-co-2,4,6-trimethyl-1,3-phenylene-4,4'-(hexafluoroisopropylidene)dipthalimide (6FDA-DETDA:DABA (3:2)), poly(1,3-phenylene-4,4'-(hexafluoroisopropylidene)diphthalimide-co-3,5-benzoic acid-4,4'-(hexafluoroisopropylidene)diphthalimide)) (6FDA-mPDA:DAM (3:2)), poly(2,4,6-trimethyl-1,3-phenylene-4,4'-(hexafluoroisopropylidene)diphthalimide-co-3, 5-benzoic acid-4,4'-(hexafluorosopropylidene)diphthalimide)) (6FDA-DAM:DABA (1:1)), poly(2,4,6-trimethyl-1,3-phenylene-4,4'-(hexafluoroisopropylidene)diphthalimide-co-3,5-benzoic acid-4,4'-(hexafluorosopropylidene)diphthalimide)) (6FDA-DAM:DABA (3:1)), poly(2,4,6-trimethyl-1,3-phenylene-4,4'-(hexafluoroisopropylidene)diphthalimide-co-3,5-benzoic acid-4,4'-(hexafluorosopropylidene)diphthalimide)) (6FDA-DAM:DABA (3:2)), poly(2,4,6-trimethyl-1,3-phenylene-4,4'-(hexafluoroisopropylidene)diphthalimide-co-3,5-benzoic acid-4,4'-(hexafluorosopropylidene)diphthalimide)) (6FDA-DAM:DABA (5:1)), and poly(1,3-phenylene-4,4'-(hexafluoroisopropylidene)diphthalimide-co-3,5-benzoic acid-4,4'-hexafluoroisopropylidene)diphthalimide) (6FDA-mPDA:DABA (3:2)). The ratio in parentheses stands for the molar ratio of the components for each polymer. In some embodiments, the 6FDA-based polyimide is 6FDA-DAM:DABA. In some embodiments, the 6FDA-based polyimide is selected from the group consisting of 6FDA-DAM, 6FDA-DAM:DABA (1:1), 6FDA-DAM:DABA (3:1), 6FDA-DAM:DABA (3:2), and 6FDA-DAM:DABA (5:1). In some embodiments, the 6FDA-based polyimide is 6FDA-DAM:DABA (3:2), wherein the 6FDA-DAM:DABA (3:2) has the formula:

230,000, about 100,000 to about 200,000, about 100,000 to about 175,000, about 100,000 to about 150,000, about 100,000 to about 125,000, about 125,000 to about 400,000, about 125,000 to about 350,000, about 125,000 to about 300,000, about 125,000 to about 275,000, about 125,000 to about 250,000, about 125,000 to about 230,000, about 125,000 to about 200,000, about 125,000 to about 175,000, about 125,000 to about 150,000, about 150,000 to about 400,000, about 150,000 to about 350,000, about 150,000 to about 300,000, about 150,000 to about 275,000, about 150,000 to about 250,000, about 150,000 to about 230,000, about 150,000 to about 200,000, about 150,000 to about 175,000, about 175,000 to about 400,000, about 17,000 to about 350,000, about 175,000 to about 300,000, about 175,000 to about 275,000, about 175,000 to about 250,000, about 175,000 to about 230,000, about 175,000 to about 200,000, about 200,000 to about 400,000, about 200,000 to about 350,000, about 200,000 to about 300,000, about 200,000 to about 275,000, about 200,000 to about 250,000, about 200,000 to about 230,000, about 230,000 to about 400,000, about 230,000 to about 350,000, about 230,000 to about 300,000, about 230,000 to about 275,000, about 230,000 to about 250,000, about 250,000 to about 400,000, about 250,000 to about 350,000, about 250,000 to about 300,000, about 250,000 to about 275,000, about 275,000 to about 400,000, about 275,000 to about 350,000, about 275,000 to about 300,000, about 300,000 to about 400,000, about 300,000 to about 350,000, or about 350,000 to about 400,000. In some embodiments, the 6FDA-based polyimide has an average molecular weight of about 150,000 to about 230,000. In some embodiments, the 6FDA-based polyimide is 6FDA-DAM:DABA (3:2) and has an average molecular weight of about 150,000 to about 230,000.

Polymers of Intrinsic Microporosity (PIM)

The blended polymeric membranes of the present disclosure contain a polymer of intrinsic microporosity (PIM). PIMs are typically characterized as having repeat units of dibenzodioxane-based ladder-type structures combined with sites of contortion, which can include those having spiro-centers or severe steric hindrance. The structures of PIMs prevent dense chain packing, causing considerably large accessible free volumes and high gas permeability.

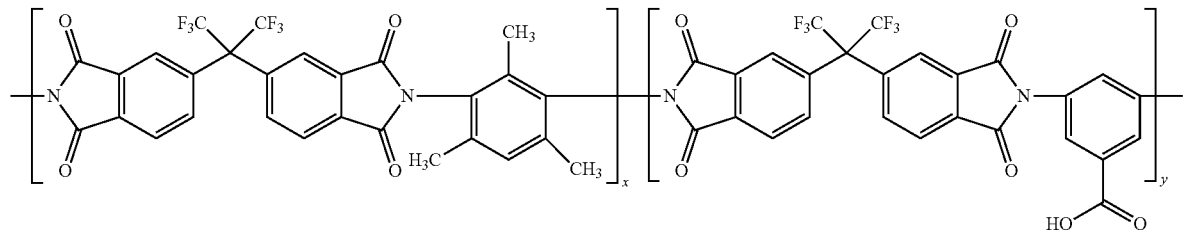

where x and y are integers based on the ratio of DAM to DABA and the desired molecular weight of the polyimide. In some embodiments, the polyimide polymeric membrane matrix is a co-polyimide polymeric membrane matrix comprising 6FDA-DAM:DABA. In some embodiments, the 6FDA-DAM:DABA is 6FDA-DAM:DABA (3:2).

The 6FDA-based polyimide of the present disclosure can have an average molecular weight of about 100,000 to about 400,000, such as about 100,000 to about 350,000, about 100,000 to about 300,000, about 100,000 to about 275,000, about 100,000 to about 250,000, about 100,000 to about Any PIM can be included in the polymeric blends of the present disclosure. In some embodiments, the PIM is selected from the group consisting of PIM-1, PIM-2, PIM-3, PIM-4, PIM-5, PIM-6, PIM-7, PIM-8, PIM-9, PIM-PI-1, PIM-PI-2, PIM-PI-3, PIM-PI-4, PIM-PI-7, PIM-PI-8, KAUST-PI-1, KAUST PI-2, PIM-BADAS-1, PIM-DUCKY-1, PIM-Tz25, PIM-DUCKY-2, PIM-BADAS-2, PIM-SADAS, derivatives thereof, and combinations thereof. Other suitable PIMs include those disclosed in Ghanem et al., Adv. Mater. (2008) 20:2766-2771; U.S. Pat.

Nos. 7,758,751; 8,623,928; and U.S. 2016/0263532; each of which is incorporated herein by reference in its entirety.

In some embodiments, the PIM is PIM-1. PIM-1 has the following structure:

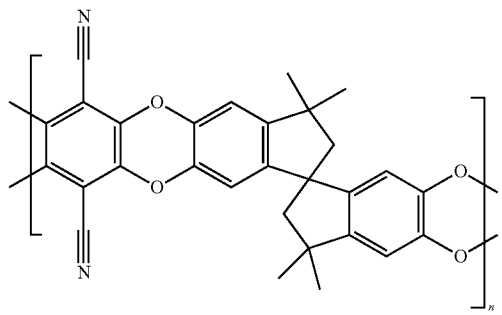

where n is an integer that represents the number of monomer units. The molecular weight of the polymer can be varied as desired by increasing or decreasing the length of the polymer (n value).

In some embodiments, the PIM has an average molecular weight of about 70,000 to about 100,000, such as about 70,000 to about 95,000, about 70,000 to about 90,000, about 70,000 to about 85,000, about 70,000 to about 80,000, about 70,000 to about 75,000, about 75,000 to about 100,000, about 75,000 to about 95,000, about 75,000 to about 90,000, about 75,000 to about 85,000, about 75,000 to about 80,000, about 80,000 to about 100,000, about 80,000 to about 95,000, about 80,000 to about 90,000, about 80,000 to about 85,000, about 85,000 to about 100,000, about 85,000 to about 95,000, about 85,000 to about 90,000, about 90,000 to about 100,000, about 90,000 to about 95,000, or about 95,000 to about 100,000. In some embodiments, the PIM has an average molecular weight of about 70,000 to about 100,000. In some embodiments, the PIM is PIM-1 and has an average molecular weight of about 70,000 to about 100,000.

Crosslinking Agent

The blended polymeric membranes of the present disclosure contain a crosslinking agent. In some embodiments, the crosslinking agent is a $CO_2$-philic crosslinking agent. In some embodiments, the $CO_2$-philic crosslinking agent is a polyethylene glycol-based polymer. In some embodiments, the polyethylene glycol-based polymer is a polyethylene glycol-bisazide (PEG-bisazide).

In some embodiments, the crosslinking agent is a PEG-bisazide crosslinking agent that has an average molecular weight (Mn) of about 200 to about 40,000, such as about 200 to about 30,000, about 200 to about 20,000, about 200 to about 10,000, about 200 to about 5,000, about 200 to about 4,000, about 200 to about 3,000, about 200 to about 2,000, about 200 to about 1,000, about 200 to about 800, about 200 to about 600, about 200 to about 400, about 400 to about 40,000, about 400 to about 30,000, about 400 to about 20,000, about 400 to about 10,000, about 400 to about 5,000, about 400 to about 4,000, about 400 to about 3,000, about 400 to about 2,000, about 400 to about 1,000, about 400 to about 800, about 400 to about 600, about 600 to about 40,000, about 600 to about 30,000, about 600 to about 20,000, about 600 to about 10,000, about 600 to about 5,000, about 600 to about 4,000, about 600 to about 3,000, about 600 to about 2,000, about 600 to about 1,000, about 600 to about 800, about 800 to about 40,000, about 800 to about 30,000, about 800 to about 20,000, about 800 to about 10,000, about 800 to about 5,000, about 800 to about 4,000, about 800 to about 3,000, about 800 to about 2,000, about 800 to about 1,000, about 1,000 to about 40,000, about 1,000 to about 30,000, about 1,000 to about 20,000, about 1,000 to about 10,000, about 1,000 to about 5,000, about 1,000 to about 4,000, about 1,000 to about 3,000, about 1,000 to about 2,000, about 2,000 to about 40,000, about 2,000 to about 30,000, about 2,000 to about 20,000, about 2,000 to about 10,000, about 2,000 to about 5,000, about 2,000 to about 4,000, about 2,000 to about 3,000, about 3,000 to about 40,000, about 3,000 to about 30,000, about 3,000 to about 20,000, about 3,000 to about 10,000, about 3,000 to about 5,000, about 3,000 to about 4,000, about 4,000 to about 40,000, about 4,000 to about 30,000, about 4,000 to about 20,000, about 4,000 to about 10,000, about 4,000 to about 5,000, about 5,000 to about 40,000, about 5,000 to about 30,000, about 5,000 to about 20,000, about 5,000 to about 10,000, about 10,000 to about 40,000, about 10,000 to about 30,000, about 10,000 to about 20,000, about 20,000 to about 40,000, about 20,000 to about 30,000, about 30,000 to about 40,000, or about 200, about 300, about 400, about 500, about 600, about 700, about 800, about 900, about 1,000, about 1,100, about 1,500, about 2,000, about 2,500, about 3,000, about 3,500, about 4,000, about 4,500, about 5,000, about 5,500, about 6,000, about 6,500, about 7,000, about 7,500, about 8,000, about 8,500, about 9,000, about 9,500, about 10,000, about 15,000, about 20,000, about 25,000, about 30,000, or about 40,000. In some embodiments, the PEG-bisazide crosslinking agent has an average molecular weight (Mn) of about 600 to about 2,000. In some embodiments, the PEG-bisazide crosslinking agent has an average molecular weight (Mn) of about 1100.

In some embodiments, the PEG-bisazide crosslinking agent has the structure:

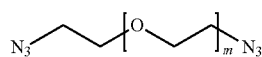

wherein m is an integer that represents the number of repeating units.

In some embodiments, the PIM is crosslinked with the PEG-bisazide crosslinking agent to produce a crosslinked PIM. In some embodiments, the PEG-bisazide crosslinking agent has an average molecular weight of about 1100. In some embodiments, the PIM is thermally crosslinked with the PEG-bisazide crosslinking agent. In some embodiments, the crosslinked PIM is blended with the polyimide membrane matrix to produce a blended polymeric membrane.

Methods of Preparing Blended Polymeric Membranes

Also provided are methods of preparing the blended polymeric membranes of the present disclosure. In some embodiments, provided is a process of making a high plasticization-resistant chemically crosslinked glassy polymer blended membrane for the removal of $CO_2$ from natural gas. In some embodiment, the blended membrane is derived from a blend of 6FDA co-polyimide base moieties, a polymer of intrinsic microporosity (PIM), and a high molecular weight $CO_2$-philic, polyethylene glycol-bisazide (PEG-bisazide) precursor as a crosslinker. In some embodiments, crosslinking of the PIM and the PEG-bisazide is achieved via nitrene reaction at high temperature, such as in a vacuum oven, during membrane processing. FIG. 1 is a schematic illustration of an exemplary blended polymeric membrane produced by the methods of the present disclosure, where the membrane contains a chemically crosslinked PIM (for example, PIM-1) produced from PIM-1 with a PEG-bisazide crosslinker via nitrene reaction at high temperature.

Figure 2:
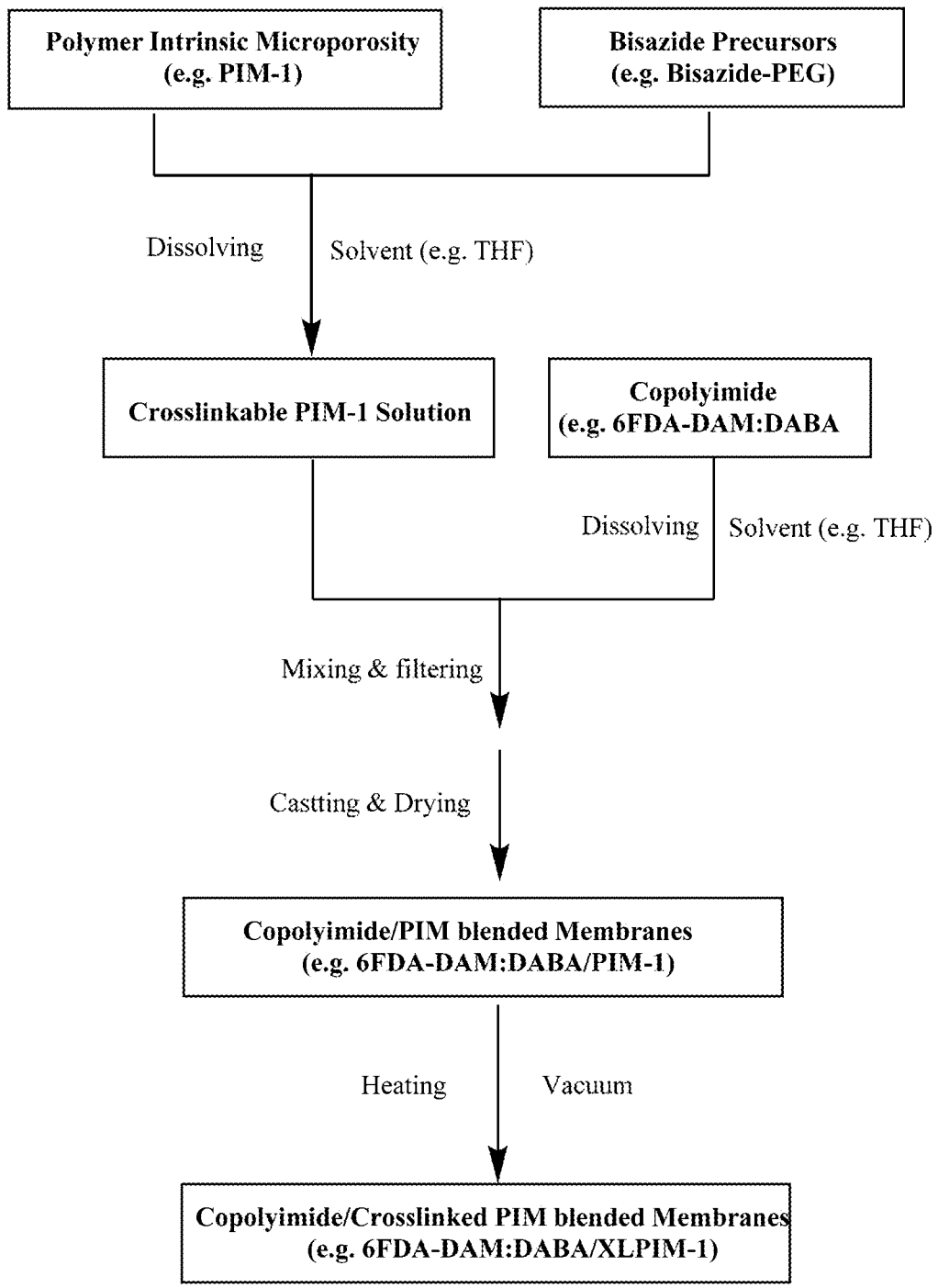
FIG. 2 is a flowchart showing the steps in the preparation of an exemplary 6FDA-DAM:DABA/XLPIM-1 (crosslinked) blended membrane.

FIG. 2 is a flowchart showing the steps in the preparation of an exemplary blended polymeric membrane of the present disclosure. In some embodiments, the membrane is a 6FDA-DAM:DABA/XLPIM-1 (crosslinked) blended membrane. In some embodiments, the membrane is a 6FDA-DAM:DABA (3:2)/XLPIM-1 (crosslinked) blended membrane.

In some embodiments, the method involves preparing a PIM solution. The PIM can be any PIM as described in the present disclosure. In some embodiments, dried PIM polymer is added to a solvent and dissolved. In some embodiments, the solvent is an organic solvent. In some embodiments, the solvent is tetrahydrofuran (THF). In some embodiments, the PIM polymer is dissolved at room temperature. In some embodiments, the PIM polymer is dissolved completely in the solvent before proceeding to the next step. In some embodiments, about 2 wt % to about 70 wt % of PIM polymer, relative to the amount of the polyimide polymer in the final membrane, is added to the solvent, such as about 5 wt % to about 70 wt %, about 5 wt % to about 60 wt %, about 5 wt % to about 50 wt %, about 5 wt % to about 40 wt %, about 5 wt % to about 30 wt %, about 5 wt % to about 20 wt %, about 5 wt % to about 10 wt %, about 10 wt % to about 70 wt %, about 10 wt % to about 60 wt %, about 10 wt % to about 50 wt %, about 10 wt % to about 40 wt %, about 10 wt % to about 30 wt %, about 10 wt % to about 20 wt %, about 20 wt % to about 70 wt %, about 20 wt % to about 60 wt %, about 20 wt % to about 50 wt %, about 20 wt % to about 40 wt %, about 20 wt % to about 30 wt %, about 30 wt % to about 70 wt %, about 30 wt % to about 60 wt %, about 30 wt % to about 50 wt %, about 30 wt % to about 40 wt %, about 40 wt % to about 70 wt %, about 40 wt % to about 60 wt %, about 40 wt % to about 50 wt %, about 50 wt % to about 70 wt %, about 50 wt % to about 60 wt %, about 60 wt % to about 70 wt %, or about 2 wt %, about 5 wt %, about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, or about 70 wt %. In some embodiments, the amount of PIM is about 5 wt %. In some embodiments, the PIM is PIM-1.

In some embodiments, the method includes preparing a PEG-bisazide solution. The PEG-bisazide can be any PEG-bisazide as described in the present disclosure. In some embodiments, PEG-bisazide is added to a solvent and dissolved. In some embodiments, the solvent is an organic solvent. In some embodiments, the solvent is tetrahydrofuran (THF). In some embodiments, the PEG-bisazide is dissolved at room temperature. In some embodiments, the PEG-bisazide is dissolved completely in the solvent before proceeding to the next step. In some embodiments, about 5 wt % to about 80 wt % of PEG-bisazide, relative to the amount of the PIM in the solution, is added to the solvent, such as about 5 wt % to about 80 wt %, about 5 wt % to about 70 wt %, about 5 wt % to about 60 wt %, about 5 wt % to about 50 wt %, about 5 wt % to about 40 wt %, about 5 wt % to about 30 wt %, about 5 wt % to about 20 wt %, about 5 wt % to about 10 wt %, about 10 wt % to about 80 wt %, about 10 wt % to about 70 wt %, about 10 wt % to about 60 wt %, about 10 wt % to about 50 wt %, about 10 wt % to about 40 wt %, about 10 wt % to about 30 wt %, about 10 wt % to about 20 wt %, about 20 wt % to about 80 wt %, about 20 wt % to about 70 wt %, about 20 wt % to about 60 wt %, about 20 wt % to about 50 wt %, about 20 wt % to about 40 wt %, about 20 wt % to about 30 wt %, about 30 wt % to about 80 wt %, about 30 wt % to about 70 wt %, about 30 wt % to about 60 wt %, about 30 wt % to about 50 wt %, about 30 wt % to about 40 wt %, about 40 wt % to about 80 wt %, about 40 wt % to about 70 wt %, about 40 wt % to about 60 wt %, about 40 wt % to about 50 wt %, about 50 wt % to about 80 wt %, about 50 wt % to about 70 wt %, about 50 wt % to about 60 wt %, about 60 wt % to about 80 wt %, about 60 wt % to about 70 wt %, about 70 wt % to about 80 wt %, or about 5 wt %, about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, or about 80 wt %. In some embodiments, the amount of PEG-bisazide is about 10 wt % to about 20 wt %. In some embodiments, the amount of PEG-bisazide is about 10 wt %. In some embodiments, the amount of PEG-bisazide is about 20 wt %. In some embodiments, the amount of PEG-bisazide is about 40 wt %. In some embodiments, the PEG-bisazide has an average molecular weight (Mn) of about 1100.

In some embodiments, the method involves preparing a crosslinkable PIM solution. In some embodiments, the solution is prepared by combining the PIM solution and the PEG-bisazide solution, such as the PIM and PEG-bisazide solutions described in the present disclosure. In some embodiments, the PIM and PEG-bisazide solutions are combined until dissolved. In some embodiments, the solutions are combined and dissolved at room temperature. In some embodiments, the resulting solution is filtered. In some embodiments, the resulting solution is filtered with a PTFE filter. In some embodiments, the resulting solution is filtered with a 1 μm PTFE filter.

In some embodiments, the method includes preparing a polyimide solution. The polyimide can be any polyimide as described in the present disclosure. In some embodiments, the polyimide is added to a solvent and dissolved. In some embodiments, the solvent is an organic solvent. In some embodiments, the solvent is tetrahydrofuran (THF). In some embodiments, the polyimide is dissolved at room temperature. In some embodiments, the polyimide is dissolved completely in the solvent before proceeding to the next step. In some embodiments, the solution is filtered. In some embodiments, the solution is filtered with a PTFE filter. In some embodiments, the resulting solution is filtered with a 1 μm PTFE filter. In some embodiments, the polyimide is a co-polyimide. In some embodiments, the co-polyimide is a 6FDA-DAM:DABA polymer. In some embodiments, the co-polyimide is 6FDA-DAM:DABA (3:2).

In some embodiments, the method involves preparing an uncrosslinked blended polymeric membrane. In some embodiments, the method involves adding the crosslinkable PIM solution to the polyimide solution. In some embodiments, the mixture is stirred until a homogenous solution is formed. In some embodiments, the mixture is stirred at room temperature. In some embodiments, the mixture is stirred for about 0.5 hours, about 1 hour, about 2 hours, about 3 hours, or more, until a homogenous solution is formed. In some embodiments, the mixture is left unstirred for a period of time to release air bubbles. In some embodiments, the mixture is left unstirred for about 0.5 hours, about 1 hour, about 2 hours, about 3 hours, or more. In some embodiments, the mixture is poured into a flat-bottomed container in order to prepare a film. In some embodiments, the film is dried to allow for evaporation of solvent. In some embodiments, the film is dried at room temperature. In some embodiments, the film is dried for up to about 12 hours at room temperature. In some embodiments, the film is dried, such as in a vacuum oven, at an elevated temperature, such as about 60° C., about 70° C., about 80° C., about 90° C., or higher. In some embodiments, the film is dried in a vacuum oven at about 80° C. In some embodiments, the film is dried at an elevated temperature for at least about 12 hours, about 18 hours, about 24 hours, about 30 hours, about 36 hours, about 42 hours, about 48 hours, or more. In some embodiments, the film is dried at an elevated temperature for about 48 hours. In some embodiments, the film is dried in a vacuum oven at about 80° C. for about 48 hours.

In some embodiments, the process includes preparing a crosslinked blended polymeric membrane. In some embodiment, the dried, uncrosslinked blended polymeric membrane is heated (thermally treated) to form a crosslinked blended polymeric membrane. In some embodiments, thermally treating the membrane allows for crosslinking of the PIM and the PEG-bisazide. In some embodiments, thermally treating the membrane allows for crosslinking of the PIM and the PEG-bisazide via nitrene reaction. In some embodiments, the dried, uncrosslinked blended membrane is heated in a high temperature vacuum oven for a period of time to form a crosslinked blended membrane. In some embodiments, the uncrosslinked membrane is heated to a temperature of about 180° C., for a period of time of at least about 72 hours. In some embodiments, the vacuum oven has a vacuum pressure of less than about 10 mbar. In some embodiments, after heating (thermally treating), the resulting membranes are cooled to room temperature. In some embodiments, the resulting blended polymeric membrane is 6FDA-DAM:DABA/XLPIM-1 (crosslinked). In some embodiments, the resulting blended polymeric membrane is 6FDA-DAM:DABA (3:2)/XLPIM-1 (crosslinked).

Thus, provided in the present disclosure is a method of preparing a blended polymeric membrane, the method including:

preparing a solution containing a polymer of intrinsic microporosity (PIM); preparing a solution containing a PEG-bisazide crosslinker; and combining the solution containing a PIM and the solution containing a PEG-bisazide crosslinker to form a crosslinkable PIM solution;

preparing a solution containing a polyimide; combining the solution containing a polyimide and the crosslinkable PIM solution to form a polyimide/crosslinkable PIM solution; casting and drying the polyimide/crosslinkable PIM solution to form a polyimide/uncrosslinked PIM blended membrane; and thermally treating the polyimide/uncrosslinked PIM blended membrane to form a polyimide/crosslinked PIM blended membrane. In some embodiments, thermally treating the membrane allows for crosslinking of the PIM and the PEG-bisazide. In some embodiments, thermally treating the membrane allows for crosslinking of the PIM and the PEG-bisazide via nitrene reaction.

Also provided is a method of preparing a blended polymeric membrane, the method including: preparing a crosslinkable PIM solution that contains a PIM and a PEG-bisazide; combining the crosslinkable PIM solution with a polyimide solution to form a polyimide/uncrosslinked PIM solution; drying the polyimide/uncrosslinked PIM solution to form a polyimide/uncrosslinked PIM blended membrane; thermally treating the polyimide/uncrosslinked PIM blended membrane to form a polyimide/crosslinked PIM blended membrane. In some embodiments, thermally treating the membrane allows for crosslinking of the PIM and the PEG-bisazide. In some embodiments, thermally treating the membrane allows for crosslinking of the PIM and the PEG-bisazide via nitrene reaction. In some embodiments of the method, the PIM is PIM-1. In some embodiments of the method, the PEG-bisazide has an average molecular weight (Mn) of about 1100. In some embodiments of the method, the polyimide is a co-polyimide. In some embodiments, the co-polyimide is a 6FDA-based co-polyimide. In some embodiments the 6FDA-based co-polyimide is 6FDA-DAM:DABA. In some embodiments the 6FDA-based co-polyimide is 6FDA-DAM:DABA (3:2). In some embodiments, the resulting blended polymeric membrane is 6FDA-DAM:DABA/XLPIM-1 (crosslinked). In some embodiments, the resulting blended polymeric membrane is 6FDA-DAM:DABA (3:2)/XLPIM-1 (crosslinked).

Also provided in the present disclosure are blended polymeric membranes prepared by the methods described herein.

Methods of Using the Blended Polymeric Membranes

Polymeric membranes are thin semipermeable barriers that selectively separate some gas compounds from others. The membranes are dense films that do not operate as a filter, but rather separate gas compounds based on how well the different compounds dissolve into the membrane and diffuse through it (the solution-diffusion model). The blended polymeric membranes of the present disclosure can be used for any gas separation application, including, but not limited to, natural gas sweetening, oxygen enrichment, hydrogen purification, and nitrogen and organic compounds removal from natural gas. In some embodiments, the membranes of the present disclosure are used for the bulk removal of acid gases from natural gas.

In some embodiments, the blended polymeric membranes of the present disclosure display improved membrane separation performance as compared to the same polyimide-based membrane that does not incorporate a PIM crosslinked with a $CO_2$-philic bisazide-based PEG crosslinker. In some embodiments, the blended polymeric membranes of the present disclosure display improved gas transport properties in natural gas separation as compared to the same polyimide-based membrane that does not incorporate a PIM crosslinked with a $CO_2$-philic bisazide-based PEG crosslinker. In some embodiments, the blended polymeric membranes of the present disclosure exhibit one or more of high $CO_2$ permeability, high $CO_2/CH_4$ selectivity, and reduced membrane plasticization, such as up to about 800 psi $CO_2$ feed pressure as compared to the same polyimide-based membrane that does not incorporate a PIM crosslinked with a $CO_2$-philic bisazide-based PEG crosslinker.

In some embodiments, the blended polymeric membranes of the present disclosure exhibit significant improvement in membrane mechanical strength, including tensile stress and Young's modulus, as compared to the same polyimide-based membrane that does not incorporate a PIM crosslinked with a $CO_2$-philic bisazide-based PEG crosslinker. In some embodiments, the blended polymeric membranes of the present disclosure exhibit an increase in tensile strength of at least about 1%, such as about 2%, about 3%, about 4%, about 5%, about 6%, about 7%, about 8%, about 9%, about 10%, about 11%, about 12%, about 13%, about 14%, about 15%, or more, as compared to the same polyimide-based membrane that does not incorporate a PIM crosslinked with a $CO_2$-philic bisazide-based PEG crosslinker. In some embodiments, the blended polymeric membranes of the present disclosure exhibit an increase in tensile strength of at least about 10% as compared to the same polyimide-based membrane that does not incorporate a PIM crosslinked with a $CO_2$-philic bisazide-based PEG crosslinker. In some embodiments, the blended polymeric membranes of the present disclosure exhibit an increase in Young's modulus of at least about 1%, such as about 2%, about 3%, about 4%, about 5%, about 6%, about 7%, about 8%, about 9%, about 10%, about 11%, about 12%, about 13%, about 14%, about 15%, or more, as compared to the same polyimide-based membrane that does not incorporate a PIM crosslinked with a $CO_2$-philic bisazide-based PEG crosslinker. In some embodiments, the blended polymeric membranes of the present disclosure exhibit an increase in Young's modulus of at least about 11% as compared to the same polyimide-based membrane that does not incorporate a PIM crosslinked with a $CO_2$-philic bisazide-based PEG crosslinker. Thus, provided in the present disclosure are methods of using the membranes of the present disclosure to improve the mechanical strength of the membrane as compared to a membrane that does not incorporate a PIM crosslinked with a $CO_2$-philic bisazide-based PEG crosslinker.

In some embodiments, the blended polymeric membranes of the present disclosure exhibit improved thermal stability as compared to the same polyimide-based membrane that does not incorporate a PIM crosslinked with a $CO_2$-philic bisazide-based PEG crosslinker. In some embodiments, the temperature at 5% weight loss for the blended polymeric membranes of the present disclosure is at least about 410° C., such as about 415° C., about 420° C., about 425° C., about 430° C., about 435° C., about 440° C., about 445° C., about 450° C., about 455° C., about 460° C., about 470° C., about 475° C., or higher. In some embodiments, the temperature at 5% weight loss for the blended polymeric membranes of the present disclosure is about 455° C. In some embodiments, the temperature at 10% weight loss for the blended polymeric membranes of the present disclosure is at least about 515° C., about 520° C., about 525° C., about 530° C., about 535° C., about 540° C., about 545° C., about 550° C., or higher. In some embodiments, the temperature at 10% weight loss for the blended polymeric membranes of the present disclosure is about 520° C. Thus, provided in the present disclosure are methods of using the membranes of the present disclosure to improve the thermal stability of a membrane as compared to a membrane that does not incorporate a PIM crosslinked with a $CO_2$-philic bisazide-based PEG crosslinker.

In some embodiments, the blended polymeric membranes of the present disclosure exhibit enhanced $CO_2$ plasticization resistance as compared to the same polyimide-based membrane that does not incorporate a PIM crosslinked with a $CO_2$-philic bisazide-based PEG crosslinker. In some embodiments, the blended polymeric membranes of the present disclosure show no $CO_2$ plasticization (no increase in $CO_2$ permeability) up to about 400 psi $CO_2$ pressure. In some embodiments, the $CO_2$ permeability of the blended polymeric membranes of the present disclosure increases by less than about 5%, about 10%, about 15%, about 20%, about 25%, about 30%, about 40%, about 45%, or less than about 50% under feed pressures up to about 800 psi as compared to feed pressure of about 50 psi. Thus, provided in the present disclosure are methods of using the membranes of the present disclosure to enhance resistance to $CO_2$ plasticization as compared to a membrane that does not incorporate a PIM crosslinked with a $CO_2$-philic bisazide-based PEG crosslinker.

In some embodiments, the blended polymeric membranes of the present disclosure exhibit increased $CO_2$ permeability as compared to the same polyimide-based membrane that does not incorporate a PIM crosslinked with a $CO_2$-philic bisazide-based PEG crosslinker. In some embodiments, the membranes exhibit a $CO_2$-permeability increase of about 10% or more, such as about 20%, about 30%, about 40%, about 50%, about 60%, about 70%, about 80%, about 90%, about 100%, or more as compared to a membrane that does not incorporate a PIM crosslinked with a $CO_2$-philic bisazide-based PEG crosslinker. Thus, provided in the present disclosure are methods of using the membranes of the present disclosure to increase $CO_2$-permeability as compared to a membrane that does not incorporate a PIM crosslinked with a $CO_2$-philic bisazide-based PEG crosslinker.

In some embodiments, the blended polymeric membranes of the present disclosure exhibit a $CO_2/CH_4$ selectivity increase as compared to the same polyimide-based membrane that does not incorporate a PIM crosslinked with a $CO_2$-philic bisazide-based PEG crosslinker. In some embodiments, the membranes exhibit a $CO_2/CH_4$ selectivity increase of about 10% or more, such as about 20%, about 30%, about 40%, about 50%, about 60%, about 70%, about 80%, about 90%, about 100%, or more as compared to a membrane that does not incorporate a PIM crosslinked with a $CO_2$-philic bisazide-based PEG crosslinker. Thus, provided in the present disclosure are methods of using the membranes of the present disclosure to increase $CO_2/CH_4$ selectivity as compared to a membrane that does not incorporate a PIM crosslinked with a $CO_2$-philic bisazide-based PEG crosslinker.

In some embodiments, the blended polymeric membranes of the present disclosure show increased single gas selectivity for $CO_2/CH_4$ compared to the same polyimide-based membrane that does not incorporate a PIM crosslinked with a $CO_2$-philic bisazide-based PEG crosslinker under the same testing conditions, such as feed temperature of 25° C. and feed pressure of 800 psi. In some embodiments, the blended polymeric membranes of the present disclosure have $CO_2/CH_4$ single gas selectivity ($\alpha CO_2/CH_4$) of about 40 or more, such as about 45 to about 100, about 45 to about 90, about 45 to about 80, about 45 to about 70, about 45 to about 60, about 45 to about 55, about 45 to about 50, about 50 to about 100, about 50 to about 90, about 50 to about 80, about 50 to about 70, about 50 to about 60, about 50 to about 55, about 60 to about 100, about 60 to about 90, about 60 to about 80, about 60 to about 70, about 70 to about 100, about 70 to about 90, about 70 to about 80, about 80 to about 100, about 80 to about 90, about 90 to about 100, or about 45, about 50, about 51, about 52, about 53, about 54, about 55, about 56, about 57, about 58, about 59, about 60, about 65, about 70, about 80, about 90, or about 100 when tested at feed temperature of 25° C. and feed pressure of 800 psi. In some embodiments, the blended polymeric membranes of the present disclosure have $CO_2/CH_4$ single gas selectivity ($\alpha CO_2/CH_4$) of about 50 to about 60 when tested at feed temperature of 25° C. and feed pressure of 800 psi.

Thus, provided are methods of separating $CO_2$ from natural gas. The methods involve providing a blended polymeric membrane, such as a membrane of the present disclosure, introducing a natural gas stream to the membrane, and separating the $CO_2$ from the natural gas. In some embodiments, the $CO_2$ is more permeable through the membrane than methane.

In some embodiments of the methods, the blended polymeric membrane is a membrane of the present disclosure that contains a co-polyimide polymeric membrane matrix, a polymer of intrinsic microporosity (PIM), and a polyethylene glycol-bisazide (PEG-bisazide) crosslinking agent, where the PIM is crosslinked with the PEG-bisazide crosslinking agent. In some embodiments, the PEG-bisazide crosslinking agent has an average molecular weight (Mn) of about 1000 to about 10,000.

EXAMPLES

Example 1—Preparation of PIM-1

PIM-1 was prepared as follows. To a 250 mL three-neck flask equipped with a stirrer, a tube for supplying dry N2, purified 5,5',6,6'-tetrahydroxy-3,3,3',3'-tetramethylspirobis-indane (15 g, 0.588 mol), freshly sublimed 2,3,5,6,-tetrafluoroterephthalonitrile (8.817 g, 0.588 mol), anhydrous DMAc (90 mL), toluene (45 mL), and $K_2CO_3$ (18.269 g, 1.764 mol) were successively charged. The mixture was stirred for 1-2 min in an N2 flow; then it was transferred in a bath with silicon oil, heated to 160° C., and was kept at this temperature for 40 min. The stirrer was then stopped and the resulting high viscous polymer was precipitated into stirring methanol (1600 mL) and stirred overnight, then was filtered and successively washed with acetone (1000 mL). After drying under vacuum, PIM-1 (21.5 g, 90.3%) was obtained as a yellow fine powder.

Example 2—Preparation of Crosslinked Blended Membranes (6FDA-DAM:DABA/XLPIM-1 Membrane)

A series of glassy copolyimide material 6FDA-DAM:DABA/crosslinked PIM-1 blended membranes (6FDA-DAM:DABA/XLPIM-1) with different ratios of components were prepared by a solution casting technique. A typical film preparation procedure was as follows.

A sample of 0.4 g dried 6FDA-DAM:DABA material was dissolved in 6 mL THF in a glass vial and rolled to dissolve completely at room temperature. Different amounts of PIM-1 material prepared according to Example 1 (2-70 wt % of the 6FDA-DAM:DABA material) was dissolved in 4 mL THF and rolled to dissolve completely at room temperature. To the PIM-1 solution, different amounts (5-80 wt % of the PIM-1 solution) of polyethylene glycol bisazide (PEG-bisazide, Mn=1100) as a crosslinker was added and stirred overnight to form a PIM-1/PEG-bisazide mixture.

The obtained PIM-1/PEG-bisazide mixture was added into the 6FDA-DAM:DABA solution and stirred overnight. The obtained 6FDA-DAM:DABA/PIM-1/PEG-bisazide solutions were filtered using 1 μm pore size PTFE filters to remove impurities, and then were left unstirred for 30 min to release air bubbles. Each polymer solution was then poured within a PTFE flat-bottomed Petri dish to prepare the dense film. The dense films were dried at room temperature overnight with a cover for slow solvent evaporation, and then dried in a vacuum oven at 80° C. for 48 hrs.

The resultant 6FDA-DAM:DABA/PIM-1/PEG-bisazide blended membranes were further crosslinked thermally via nitrene reaction in a high temperature vacuum oven. The vacuum oven temperature was raised to 150-250° C. at a rate of 10° C./min and held for a period time (>72 hrs). After the thermal treatment process, the membranes were cooled naturally in the vacuum oven to room temperature and stored in a drybox for further studies. The resultant 6FDA-DAM:DABA/XLPIM-1 (crosslinked) blended membranes had thicknesses in the range of 25 to 50 μm. Table 1 depicts the membranes prepared. Membrane 2 was used in Examples 6 and 7.

TABLE 1

6FDA-DAM:DABA/XLPIM-1 membranes (crosslinked)

| Membrane | 6FDA-DAM:DABA (g) | PIM-1 (g) | PEG-bisazide (g) | PI:PIM-1 ratio (w/w %) | PEG-bisazide % (% of PIM-1) |
|---|---|---|---|---|---|
| 1 | 3.80 | 0.20 | 0.02 | 95:5 | 10 |
| 2 | 3.80 | 0.20 | 0.04 | 95:5 | 20 |
| 3 | 3.80 | 0.20 | 0.06 | 95:5 | 30 |
| 4 | 3.80 | 0.20 | 0.08 | 95:5 | 40 |
| 5 | 3.80 | 0.20 | 0.12 | 95:5 | 60 |
| 6 | 3.80 | 0.20 | 0.16 | 95:5 | 80 |

Example 3—Preparation of Uncrosslinked Blended Membranes (6FDA-DAM:DABA/PIM-1 Membrane)

A series of glassy copolyimide material 6FDA-DAM:DABA (3:2)/uncrosslinked PIM-1 blended membranes (6FDA-DAM:DABA/PIM-1) with different ratios of components were prepared by a solution casting technique. A typical film preparation procedure was as follows.

A sample of 0.4 g dried 6FDA-DAM:DABA (3:2) material was dissolved in 10 mL THF in a glass vial and rolled to dissolve completely at room temperature. Different amounts of PIM-1 material prepared according to Example 1 (2-70 wt % of the 6FDA-DAM:DABA material) was added into the 6FDA-DAM:DABA solution and stirred overnight to form a 6FDA-DAM:DABA/PIM-1 mixture. The obtained 6FDA-DAM:DABA/PIM-1 mixture was filtered using a 1 μm pore size PTFE filter to remove impurities, and then was left unstirred for 30 min to release air bubbles. The polymer solution was poured within a PTFE flat-bottomed Petri dish to prepare the dense film. The dense film was dried at room temperature overnight with a cover for slow solvent evaporation, and then dried in a vacuum oven at 80° C. and 110° C. for 48 hrs. The membranes were cooled naturally in the vacuum oven to room temperature and stored in a drybox for further studies. The resultant 6FDA-DAM:DABA/PIM-1 (uncrosslinked) blended membranes had thicknesses in the range of 15 to 60 μm. Table 2 depicts the membranes prepared. Membrane 8 was used in Examples 6 and 7.

TABLE 2

6FDA-DAM:DABA/PIM-1 membranes (uncrosslinked)

| Membrane | 6FDA-DAM:DABA (g) | PIM-1 (g) | PI:PIM-1 ratio (w/w %) |
|---|---|---|---|
| 7 | 3.92 | 0.08 | 98:2 |
| 8 | 3.80 | 0.20 | 95:5 |
| 9 | 3.60 | 0.40 | 90:10 |
| 10 | 3.20 | 0.80 | 80:20 |
| 11 | 2.80 | 1.20 | 70:30 |
| 12 | 2.00 | 2.00 | 50:50 |
| 13 | 1.20 | 2.80 | 30:70 |

Example 4—Preparation of Comparative Copolyimide Membrane (6FDA-DAM:DABA Membrane)

A neat glassy copolyimide material 6FDA-DAM:DABA (3:2) membrane was prepared using the solution casting technique. Briefly, a sample of 0.4 g of dried 6FDA-DAM:DABA material was added into 10 mL THF in a glass vial and rolled to dissolve completely at room temperature. The polymer solution was filtered using a 1 µm pore size PTFE filter to remove impurities, and then was poured within a PTFE flat-bottomed Petri dish to prepare the dense film. The dense film was dried at room temperature for 48 hrs with a cover for slow solvent evaporation, and then dried in a vacuum oven at 80° C. and 110° C. for 48 hrs. The membranes were cooled naturally in the vacuum oven to room temperature and stored in a drybox for further studies. The resulting membranes had an average thickness of 15 to 35 µm.

Example 5—Preparation of Comparative Polymer of Intrinsic Microporosity Membrane (PIM-1 Membrane)

A neat polymer of intrinsic microporosity (PIM-1) membrane was prepared using the solution casting technique. Briefly, a sample of 0.4 g of PIM-1 (homemade) was added into 10 mL THF and rolled to dissolve completely at room temperature. The polymer solution was filtered using a 1 µm pore size PTFE filter to remove impurities, and then was poured within a PTFE flat-bottomed Petri dish to prepare the dense film. The dense film was dried at room temperature for 48 hrs with a cover for slow solvent evaporation, and then dried in a vacuum oven at 80° C. for 48 hrs. The membrane was cooled naturally in the vacuum oven to room temperature and stored in a drybox for further studies. The resulting membranes had an average thickness of 40 to 110 µm.

Example 6—Membrane Mechanical and Thermal Properties

The physical properties of the membranes prepared according to Examples 2-5 were characterized mechanically via Universal Instron (Universal Instron 5969) at 25° C. and thermally via differential scanning calorimetry (Discovery DSC, 30-400° C. at a scanning rate of 10° C./min) and thermogravimetric analysis (Discovery TGA, 30-800° C. at a scanning rate of 10° C./min).

Figure 3:
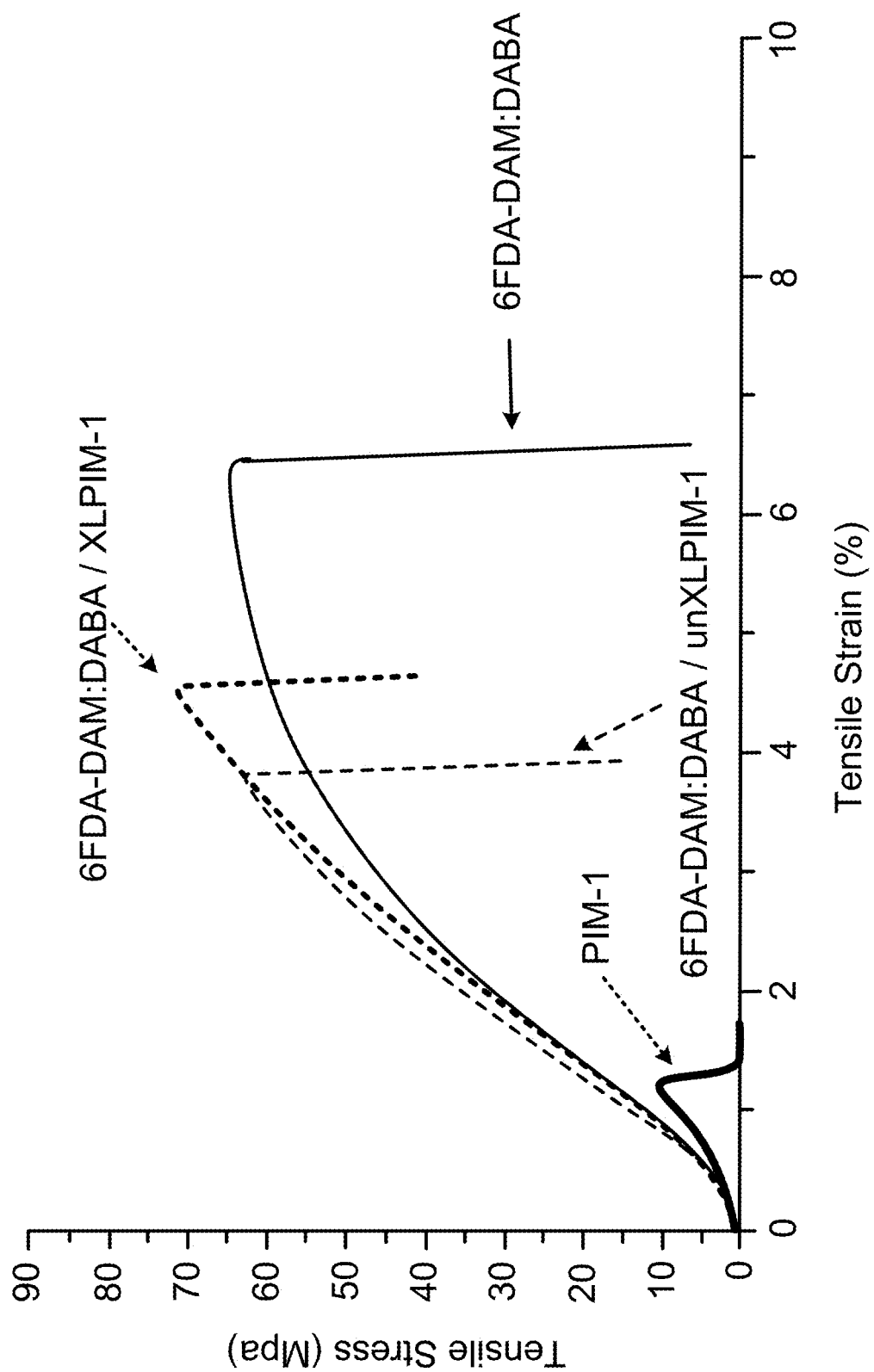
FIG. 3 is a graph showing the tensile stress-strain curves of neat membranes (6FDA-DAM:DABA and PIM-1) and blended membranes (6FDA-DAM:DABA/PIM-1 (uncrosslinked) and 6FDA-DAM:DABA/XLPIM-1 (crosslinked)).

FIG. 3 shows the stress-strain curves of the comparative membranes (6FDA-DAM:DABA and PIM-1) and blended membranes, 6FDA-DAM:DABA/uncrosslinked PIM-1 (or un-XLPIM-1) and 6FDA-DAM:DABA/crosslinked PIM-1 (or XLPIM-1). The crosslinked PIM-1 blended with the 6FDA-DAM:DABA-based membrane showed improvement to the mechanical strength as compared to the comparative 6FDA-DAM:DABA membrane. As depicted in Table 3, the 6FDA-DAM:DABA/XLPIM-1 (crosslinked) blended membrane exhibited tensile strength and Young's modulus of about 71.2 MPa and 2.1 GPa, respectively. These values were higher than that of the comparative 6FDA-DAM:DABA membrane, while only slightly decreased in tensile strain. These results indicated that the 6FDA-DAM:DABA/XLPIM-1 (crosslinked) blended membrane possessed excellent mechanical properties for gas separation applications.

TABLE 3

Mechanical properties of the membranes

| Membrane | Tensile stress (MPa) | Tensile strain (%) | Young's Modulus (GPa) |
| --- | --- | --- | --- |
| 6FDA-DAM:DABA (neat) | 64.5 | 6.2 | 1.9 |
| 6FDA-DAM:DABA/un-XLPIM-1, 95/5 | 63.3 | 3.8 | 2.3 |
| 6FDA-DAM:DABA/XLPIM-1, 95/5 (10% crosslinker) | 71.2 | 4.5 | 2.2 |
| PIM-1 (neat) | 10.4 | 1.2 | 1.2 |

Figure 4:
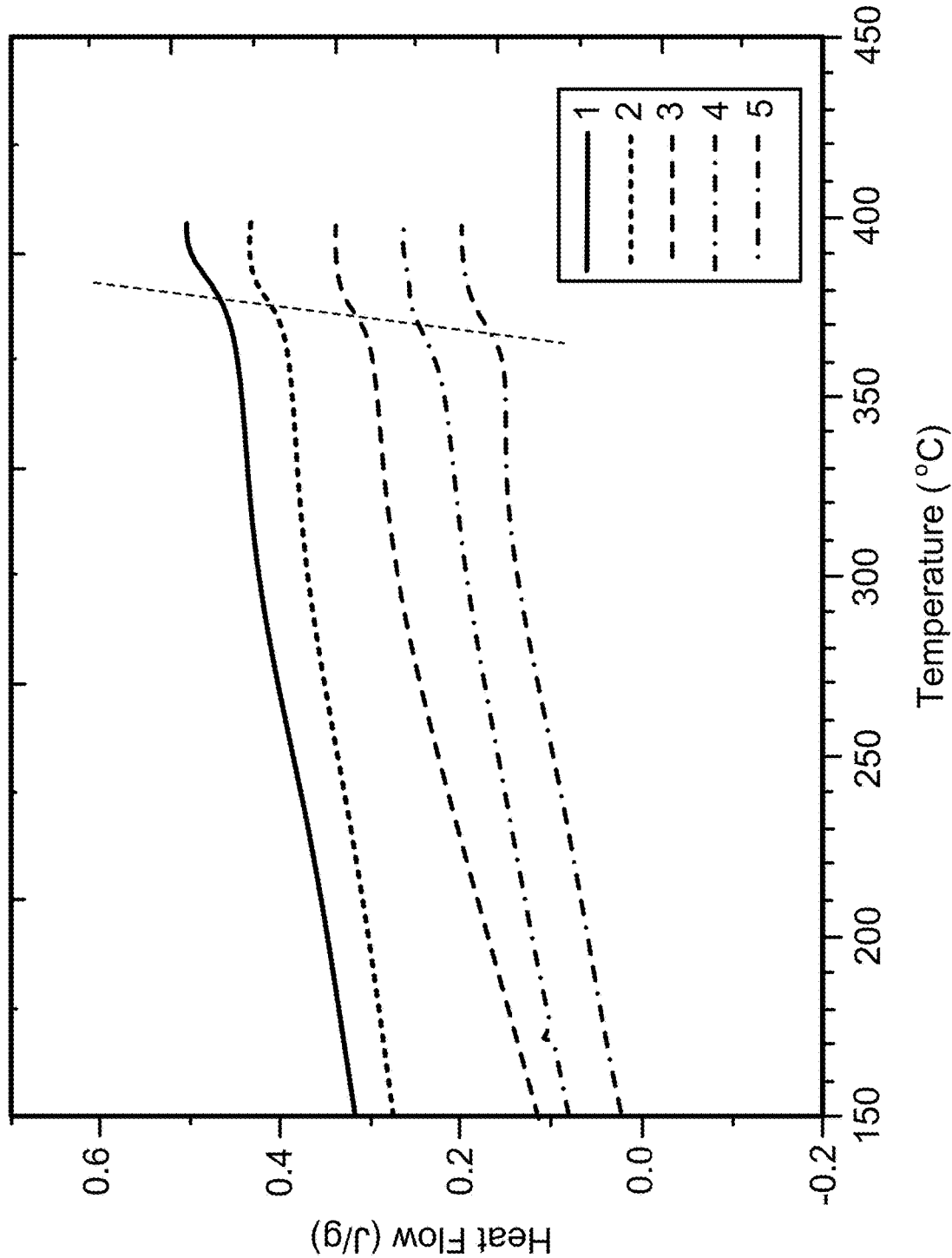
FIG. 4 depicts DSC thermographs of copolyimide and blended copolyimide membranes: (1) neat 6FDA-DAB:DABA; (2) 6FDA-DAM:DABA/un-XLPIM-1 (95/5); (3) 6FDA-DAM:DABA/XLPIM-1 (95/5), 10% crosslinker; (4) 6FDA-DAM:DABA/XLPIM-1 (95/5), 20% crosslinker; and (5) 6FDA-DAM:DABA/XLPIM-1 (95/5), 40% crosslinker.

Thermal stability of the membranes was determined by thermal analysis (DSC and TGA). FIG. 4 shows DSC thermographs of the comparative 6FDA-DAM:DABA membrane, the 6FDA-DAM:DABA/un-XLPIM-1 and 6FDA-DAM:DABA/XLPIM-1 membranes. The glass transition temperatures ($T_g$) of the membranes were measured and the results are shown in Table 4. Since the $T_g$ of the comparative PIM-1 membrane could not be detected because of the high stiffness and low rational freedom of polymer chain, only the blended membranes were measured.

TABLE 4

Glass transition temperature of the blended membranes

| Membrane | $T_g$ (° C.) |
| --- | --- |
| 6FDA-DAM:DABA (neat) | 378.7 |
| 6FDA-DAM:DABA/un-XL PIM-1 (95/5) | 373.8 |
| 6FDA-DAM:DABA/XLPIM-1 (95/5) (10% crosslinker) | 371.3 |
| 6FDA-DAM:DABA/XLPIM-1 (95/5) (20% crosslinker) | 368.9 |
| 6FDA-DAM:DABA/XLPIM-1 (95/5) (40% crosslinker) | 370.9 |

Figure 5:
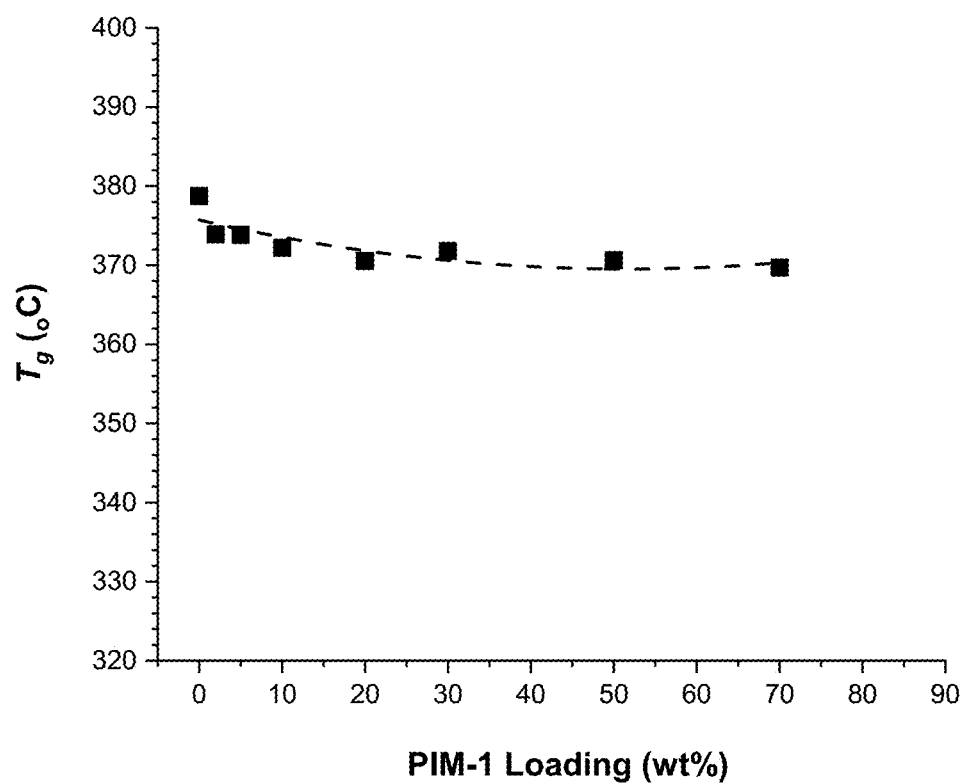
FIG. 5 is a graph showing the effect of the loading of PIM-1 on the glass transition temperature ($T_g$) of 6FDA-DAM:DABA/un-XLPIM-1 (uncrosslinked) blended membranes.
Figure 6:
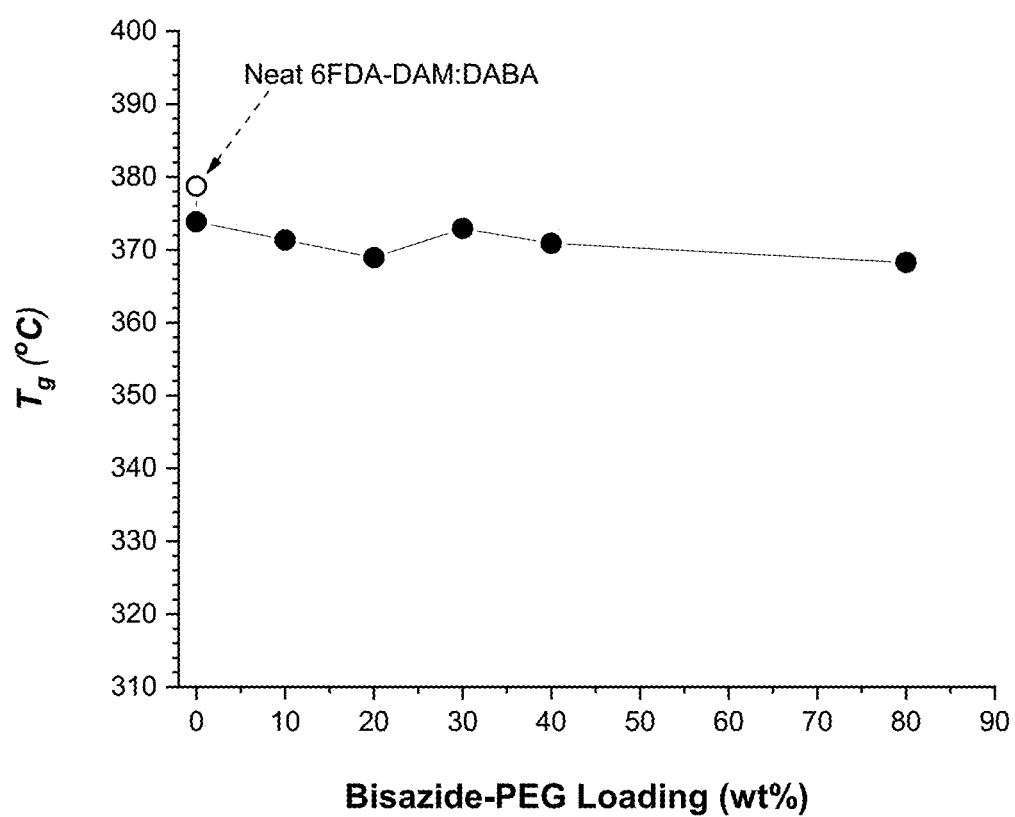
FIG. 6 is a graph showing the effect of the loading of bisazide-PEG crosslinking agent ($T_g$=42.1° C.) on the glass transition temperature ($T_g$) of 6FDA-DAM:DABA/XLPIM-1 (crosslinked) blended membranes.

The comparative 6FDA-DAM:DABA membrane had a $T_g$ of about 379° C., while the $T_g$ of the blended membranes slightly decreased with increased loadings of either PIM-1 (FIG. 5) or crosslinked PIM-1 (FIG. 6). No $T_g$ was observed for PIM-1 because this value was higher than its decomposition temperature.

Figure 7:
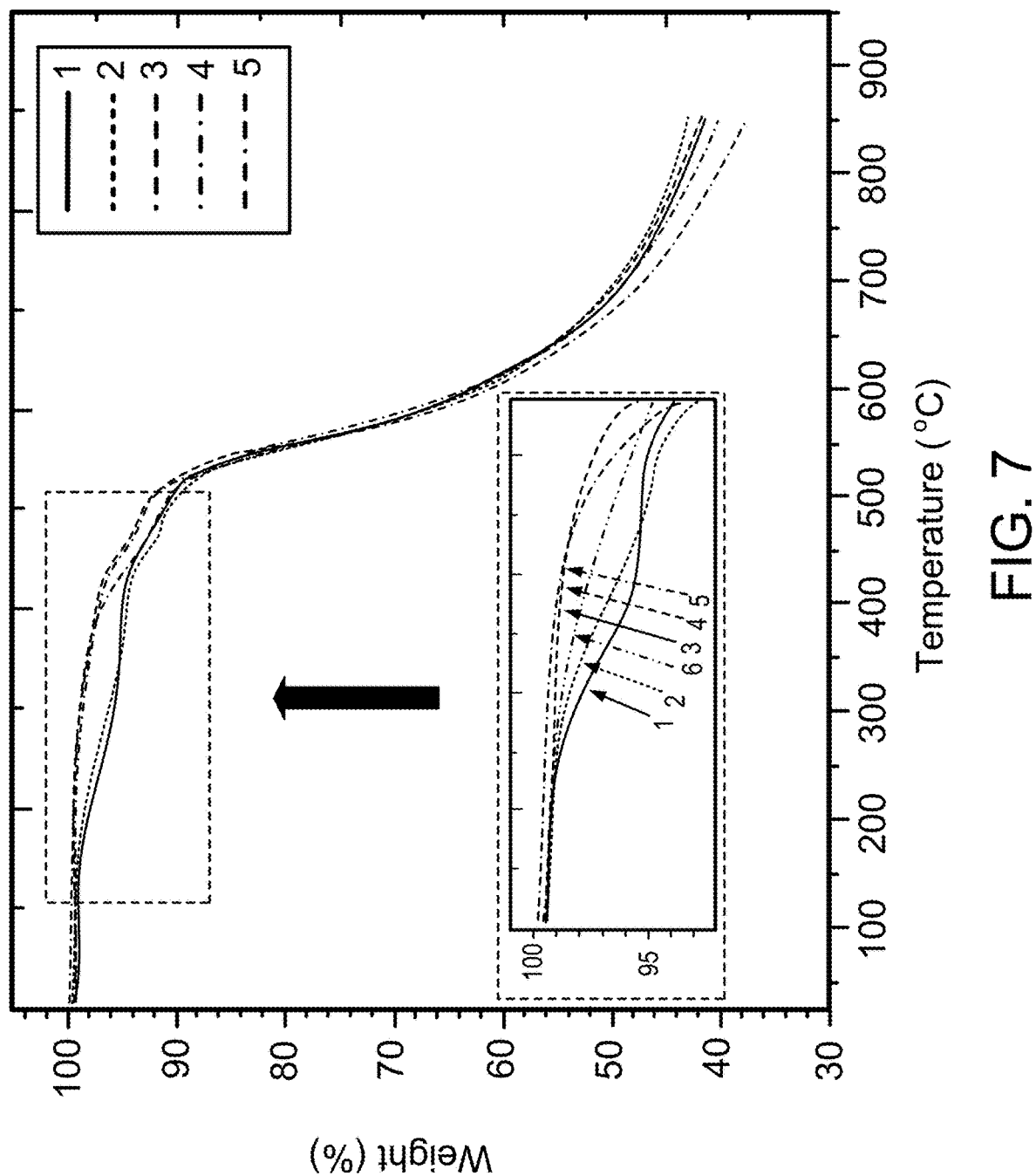
FIG. 7 depicts the TGA curves of copolyimide and blended copolyimide membranes: (1) 6FDA-DAB:DABA; (2) 6FDA-DAM:DABA/PIM-1 (95/5); (3) 6FDA-DAM:DABA/XLPIM-1 (95/5), 10% crosslinker; (4) 6FDA-DAM:DABA/XLPIM-1 (95/5), 20% crosslinker; and (5) 6FDA-DAM:DABA/XLPIM-1 (95/5), 40% crosslinker.

FIG. 7 shows the TGA curves of the comparative 6FDA-DAM:DABA membrane and the blended membranes with PIM-1 and crosslinked PIM-1. The 6FDA-DAM:DABA/XLPIM blended membranes (inset figure) displayed thermal stability of up to 400° C. as a result of the strong dipolar interactions of the nitrile groups in crosslinked PIM-1. Table 5 depicts the thermal stability values of the membranes.

TABLE 5

Thermal stability of the membranes

| Membrane | $T_{d@5wt\%}$ (° C.) | $T_{d@10wt\%}$ (° C.) |
| --- | --- | --- |
| 6FDA-DAM:DABA | 409.8 | 510.6 |
| 6FDA-DAM:DABA/un-XL PIM-1, 95/5 | 374.3 | 501.7 |
| 6FDA-DAM:DABA/XLPIM-1, 95/5 (10% crosslinker) | 553.2 | 520.2 |
| 6FDA-DAM:DABA/XLPIM-1, 95/5 (20% crosslinker) | 554.3 | 517.2 |
| 6FDA-DAM:DABA/XLPIM-1, 95/5 (40% crosslinker) | 554.8 | 507.6 |

As can be seen in Table 5, the 6FDA-DAM:DABA/XLPIM-1 blended membrane showed an increase in degradation temperature (Ta) compared to the comparative 6FDA-DAM:DABA membrane and the 6FDA-DAM:DABA/un-XLPIM-1 blended membrane, indicating that the mixing of crosslinked PIM-1 into membrane matrix can be regulated to improve the overall thermal stability of the blended membranes.

Example 7—Membrane Permeation Properties

Figure 8:
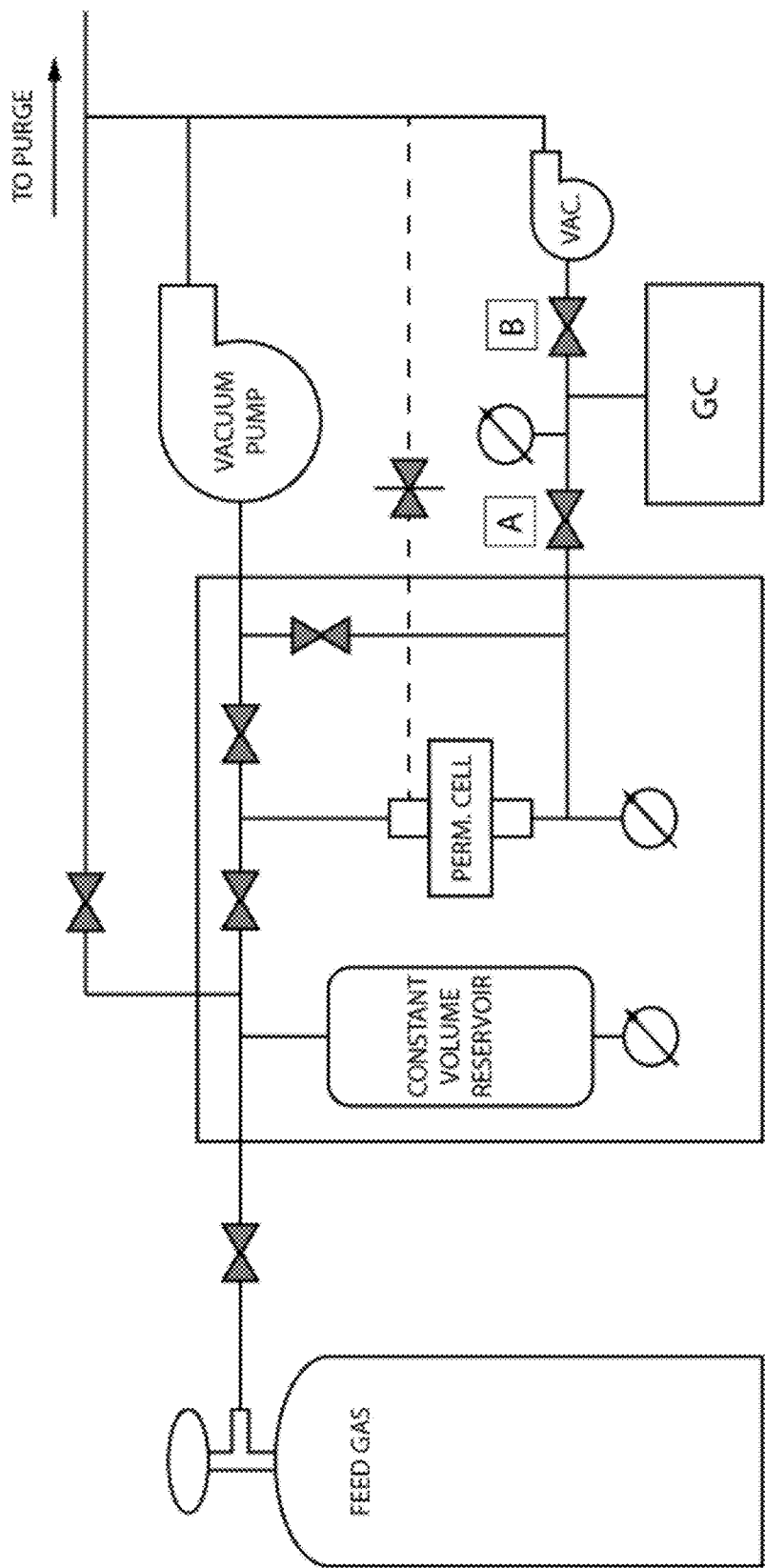
FIG. 8 is a schematic diagram of an exemplary constant-volume, variable pressure permeation apparatus used for measuring single gas and mixed gas permeation properties.

Gas permeation tests were performed in triplicate on the membranes prepared according to Examples 2-5 using a constant-volume, variable-pressure technique. A schematic diagram of this custom-built permeation apparatus is shown in FIG. 8. A stainless-steel permeation cell with 47 mm disc filters was purchased from EMD Millipore. An epoxy masked membrane sample of 5-20 mm in diameter was inserted and sealed in the testing cell, and the permeation system was completely evacuated for 1 hour before each test. Pure gas permeability coefficients were measured at 25° C. and feed pressure range of 25 to 800 psi in the order of $CH_4$ followed by $CO_2$ to avoid swelling. Steady-state permeation was verified using the time-lag method, where 10 times the diffusion time-lag was taken as the effective steady-state. The upstream (feed) pressure and the downstream (permeate) pressure were measured using Baraton absolute capacitance transducers (MKS Instruments) and recorded using LabVIEW software. The permeate pressure was maintained below 100 torr. Mixed gas permeation was performed at 25° C. and feed pressure range of 200 psi to 800 psi. A retentate stream was added for mixed gas tests and adjusted to 100 times the permeate flow rate to maintain <1% stage cut. The permeate gas was collected and then injected into a Shimadzu gas chromatograph (GC-2014) to measure permeate composition. Permeate injections were performed at 95 torr. An Isco pump (TeledyneIsco) was used to control the feed pressure.

Permeability coefficients of gas i, $P_i$, were calculated according to Equation 1, where $dP_i/d_t$ is the slope of the steady state pressure rise in the downstream, V is the downstream volume, R is the ideal gas constant, T is the temperature of the downstream, L is the membrane thickness (determined via JEOL 7100F scanning electron microscopy images of membrane cross sections), A is the membrane surface area (estimated using ImageJ image processing software), and $\Delta f_i$ is the partial fugacity difference across the membrane calculated using the Peng-Robinson equation. Permselectivity, $\alpha_{i/j}$, was calculated as the ratio of permeability coefficients as expressed in Equation 2.

$$P_i = \frac{dP_i}{d_t} \frac{VL}{RTA\Delta f_i} \quad (1)$$

$$\alpha_{i/j} = \frac{P_i}{P_j} \quad (2)$$

6FDA-DAM:DABA/Un-XLPIM-1 (Uncrosslinked) Blended Membranes

Figure 9:
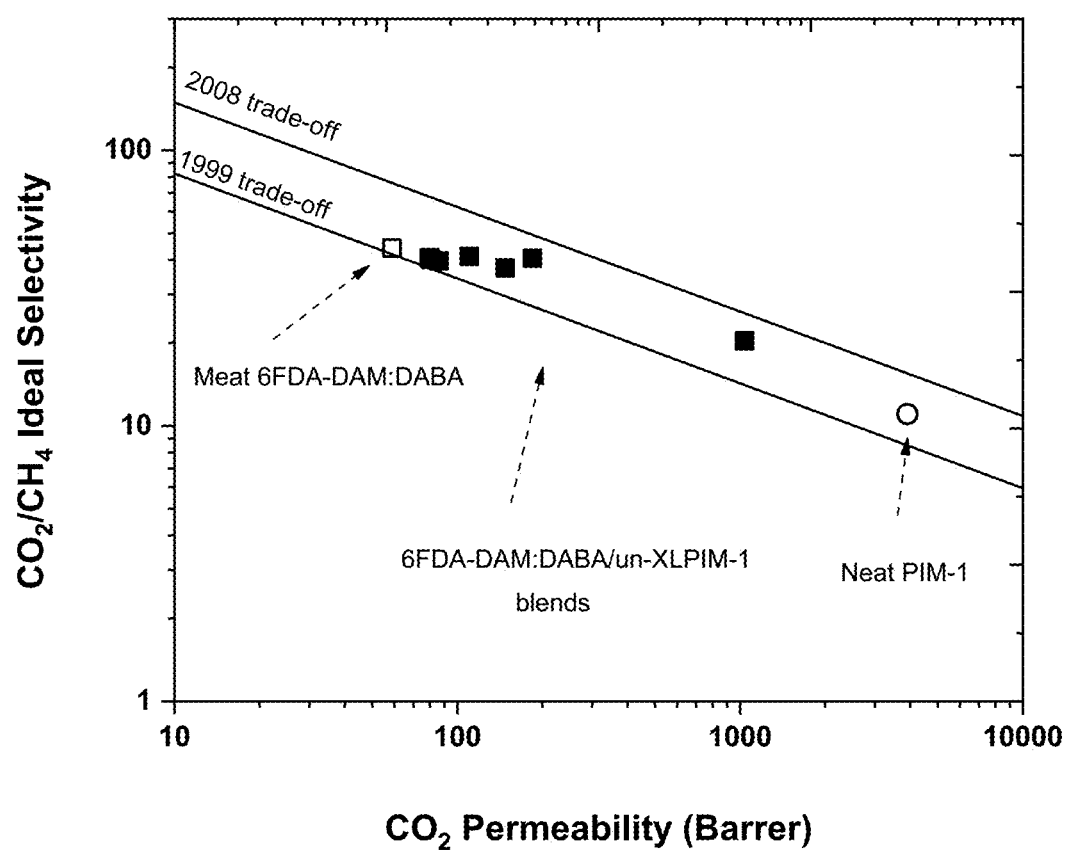
FIG. 9 depicts the membrane permeability-selectivity trade-off ($CO_2/CH_4$ vs. $CO_2$) comparison of a neat 6FDA-DAM:DABA membrane (open square), a neat PIM-1 membrane (open circle), and 6FDA-DAM:DABA/un-XLPIM-1 (uncrosslinked) blended membranes (solid squares, from left to right, with PIM-1 loadings of 2, 5, 10, 20, 30, 50, and 70%) in pure gas (tested at 25° C. and 100 psi).
Figure 10:
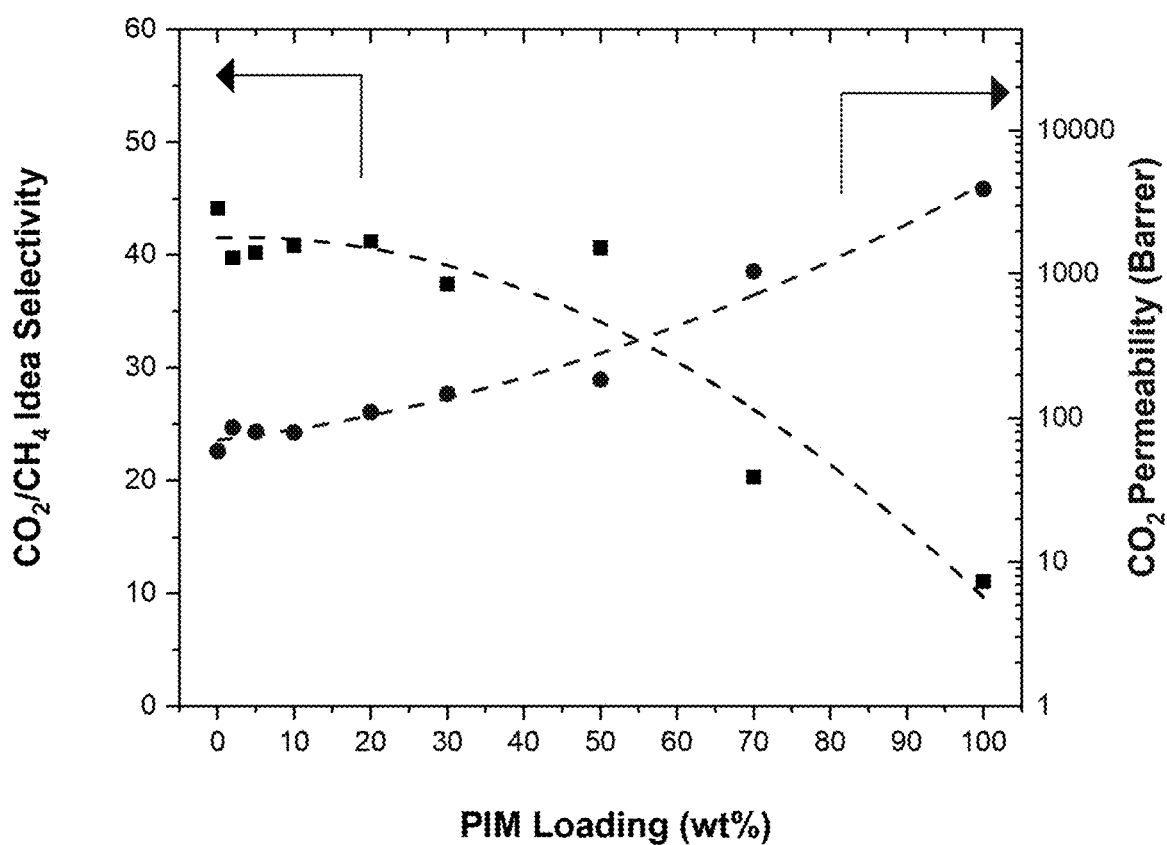
FIG. 10 is a graph showing the effect of PIM-1 loading on $CO_2/CH_4$ selectivity and $CO_2$ permeability for 6FDA-DAM:DABA/un-XLPIM-1 (uncrosslinked) blended membranes under single gas testing conditions (25° C. and 100 psi).

The pure gas permeation properties for the comparative neat membranes (6FDA-DAM:DABA and PIM-1) and the 6FDA-DAM:DABA/un-XLPIM-1 (uncrosslinked) blended membranes prepared according to Examples 2-5 are shown in FIG. 9. The results showed that the $CO_2/CH_4$ gas separation performance went along with the Robeson upper bound lines (1991 and 2008) with increased PIM-1 loading in the blended membranes. The effect of loading PIM-1 on the separation performance of the blended membrane is shown in FIG. 10. The incorporation of uncrosslinked PIM-1 (2-70 wt %) in the membrane matrix resulted in a significant increase in $CO_2$ permeability, but remarkably decreased $CO_2/CH_4$ selectivity. These results are consistent with such polymers reported in the literature. See, for example, J. Membr. Sci. (2012) 407-408:47-57; J. Membr. Sci. (2014) 453:614-623; J. Membr. Sci. (2014) 462:119-130; Sep. Purif. Technol. (2020) 242:116766; J. Membr. Sci. (2016) 518:110-119; J. Membr. Sci. (2018) 566:77-86; Sep. Purif. Technol. (2019) 224:456-462; and U.S. Pat. No. 7,410,525.

6FDA-DAM:DABA/XLPIM-1 (Crosslinked) Blended Membranes

To further improve membrane separation productivity (permeability) and at the same time maintain or enhance separation efficiency (selectivity), membranes made from a blend of 6FDA-DAM:DABA with PIM-1 were prepared, followed by chemically crosslinking with a high molecular (Mw=1100) PEG-bisazide precursor crosslinker, as described in Example 2. The permeation properties of the 6FDA-DAM:DABA/XLPIM-1 (crosslinked) blended membranes and 6FDA-DAM:DABA/un-XLPIM-1 (uncrosslinked) blended membranes (prepared according to Example 3) are shown in Table 6. The membranes were tested at 25° C. and a feed pressure of 100 psi.

TABLE 6

Single gas permeation results for uncrosslinked and crosslinked blended membranes

| Membranes | $P_{CO2}$ (Barrer) | $P_{CO2}$ increased | $P_{CH4}$ (Barrer) | $\alpha_{CO2/CH4}$ | $\alpha_{CO2/CH4}$ increased |
|---|---|---|---|---|---|
| 6FDA-DAM:DABA/un-XL PIM-1, 95/5 | 80.5 | — | 2.0 | 40.1 | — |
| 6FDA-DAM:DABA/XLPIM-1, 95/5 (10% crosslinker) | 110.2 | 37% | 2.7 | 40.2 | 0% |
| 6FDA-DAM:DABA/XLPIM-1, 95/5 (20% crosslinker) | 109.8 | 36% | 2.7 | 40.7 | 1% |
| 6FDA-DAM:DABA/XLPIM-1, 95/5 (40% crosslinker) | 72.0 | −11% | 1.6 | 44.1 | 10% |

Under single gas testing conditions, the 6FDA-DAM:DABA/XL-PIM-1 (crosslinked) blended membranes with 10% and 20% crosslinker exhibited further improvement in $CO_2$ permeability (36% or 37% increase) and comparable $CO_2/CH_4$ selectivity compared to the 6FDA-DAM:DABA/un-XLPIM-1 (uncrosslinked) blended membrane. This could be due to the incorporation of the $CO_2$-philic PEG segment inside the membrane matrix after thermally crosslinking with PIM-1.

Figure 11:
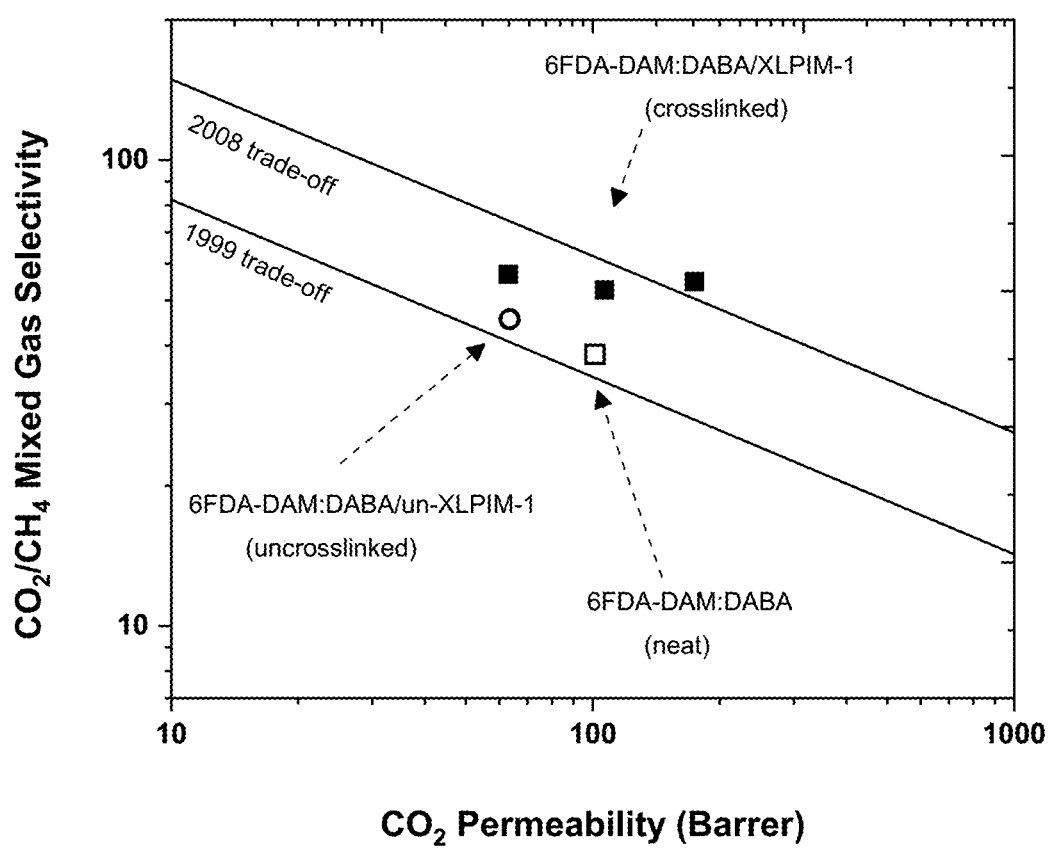
FIG. 11 depicts the membrane permeability-selectivity trade-off ($CO_2/CH_4$ vs. $CO_2$) comparison of a neat 6FDA-DAM:DABA membrane (open square), 6FDA-DAM:DABA/un-XLPIM-1 (uncrosslinked) (95/5) blended membranes (solid circle), and 6FDA-DAM:DABA/XLPIM-1 (crosslinked) (95/5) blended membranes (solid squares, from left to right, crosslinked with different amount of PEG-bisazide crosslinker loadings (10%, 20%, and 40%)) in a 20% $CO_2$/80% $CH_4$ mixed gas mixture (tested at 25° C. and 800 psi).

The gas transport properties of the 6FDA-DAM:DABA/XLPIM-1 (crosslinked) blended membranes were further tested under high-pressure mixed gas (20% $CO_2$ and 80% $CH_4$) at feed pressure up to 800 psi, since interactions between gas species A (for example, $CO_2$) through the membrane may influence the permeation of gas species B (for example, $CH_4$) through the membrane. FIG. 11 shows the mixed gas separation performance against the Roberson upper bound for $CO_2/CH_4$ separation at a feed pressure of 800 psi. By incorporating and crosslinking $CO_2$-philic PEG-bisazide into 6FDA-DAM:DABA/PIM-1 blended membranes, the resulting 6FDA-DAM:DABA/XLPIM-1 (crosslinked) blended membranes exhibited significant improvement in $CO_2/CH_4$ mixed gas selectivity.

Figure 12:
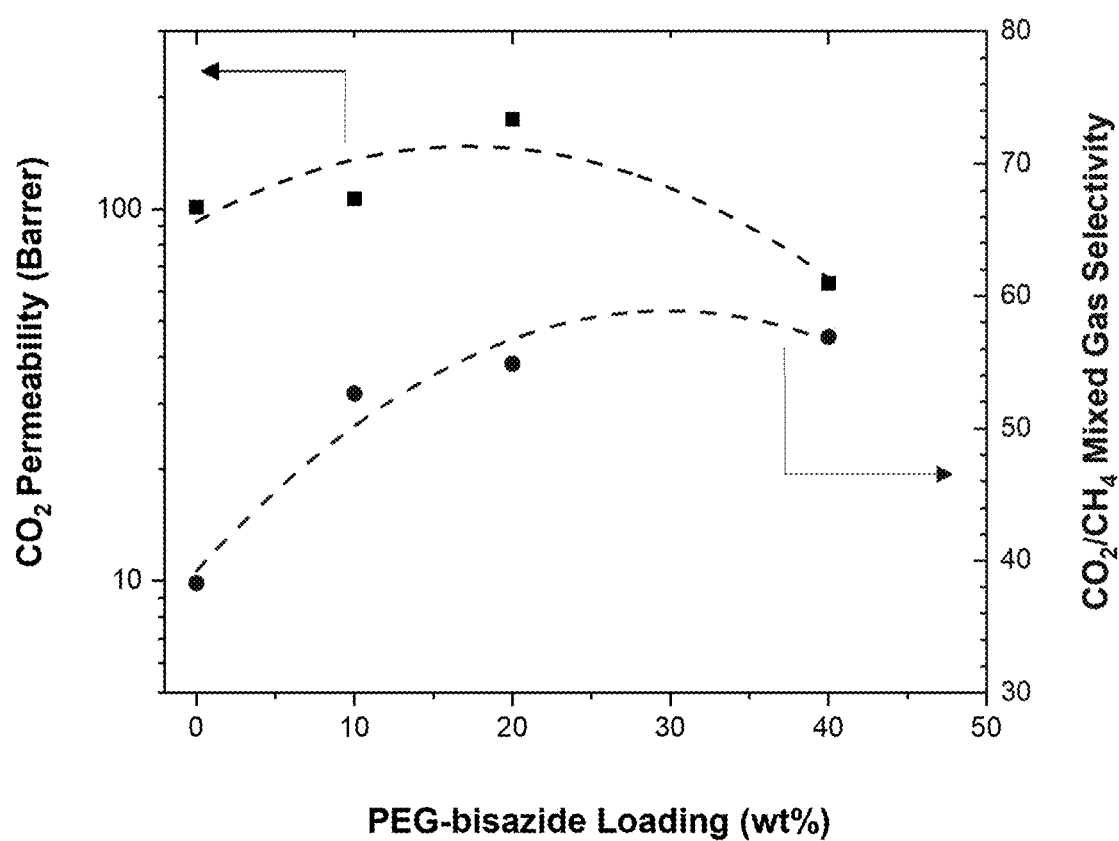
FIG. 12 is a graph showing the effect of a PEG-bisazide crosslinking agent on $CO_2/CH_4$ mixed gas selectivity and $CO_2$ permeability of 6FDA-DAM:DABA/XLPIM-1 (crosslinked) (95/5) blended membranes under a 20% $CO_2$/80% $CH_4$ mixed gas mixture tested at 25° C. and 800 psi.

Furthermore, addition of PEG-bisazide in certain amounts (for example, 20%) induced the improvement of permeability (72% increase in $CO_2$ permeability) and selectivity (43% increase in $CO_2/CH_4$ mixed gas selectivity) simultaneously as compared to the comparative 6FDA-DAM:DABA membrane, and a 175% increase in $CO_2$ permeability and 20% increase in $CO_2/CH_4$ mixed gas selectivity compared to the 6FDA-DAM: DABA/un-XLPIM-1 (uncrosslinked) blended membrane (FIG. 12). The results, depicted in Table 7, show that the 6FDA-DAM:DABA/XLPM-1 (crosslinked) blended membrane prepared by blending 5 wt % of PIM-1 into a 6FDA-DAM:DABA matrix and further crosslinked with 20% bisazide-PEG had a $CO_2/CH_4$ mixed gas selectivity and a $CO_2$ permeability of 54.9 and 174.5 Barrer, respectively, compared to the comparative 6FDA-DAM:DABA membrane with 38.3 and 101.3 Barrer, respectively, and the 6FDA-DAM:DABA/un-XLPIM-1 (uncrosslinked) blended membrane with 45.6 and 63.5 Barrer, respectively. The membranes were tested at 25° C. and a feed pressure of 800 psi.

TABLE 7

Mixed gas (20% $CO_2$/80% $CH_4$) permeation results for the membranes

| Membranes | $P_{CO2}$ (Barrer) | $P_{CO2}$ increased | $P_{CH4}$ (Barrer) | $\alpha_{CO2/CH4}$ | $\alpha_{CO2/CH4}$ increased |
|---|---|---|---|---|---|
| 6FDA-DAM: DABA (neat) | 101.2 | — | 2.6 | 38.3 | — |
| 6FDA-DAM: DABA/ un-XL PIM-1, 95/5 | 63.5 | −37% | 1.4 | 45.6 | 19% |
| 6FDA-DAM: DABA/ XLPIM-1, 95/5 (10% crosslinker) | 106.7 | 5% | 2.7 | 52.7 | 38% |
| 6FDA-DAM: DABA/ XLPIM-1, 95/5 (20% crosslinker) | 174.5 | 72% | 2.7 | 54.9 | 43% |
| 6FDA-DAM: DABA/ XLPIM-1, 95/5 (40% crosslinker) | 63.1 | −38% | 1.6 | 56.9 | 49% |

$CO_2$ Plasticization Resistance

Figure 13:
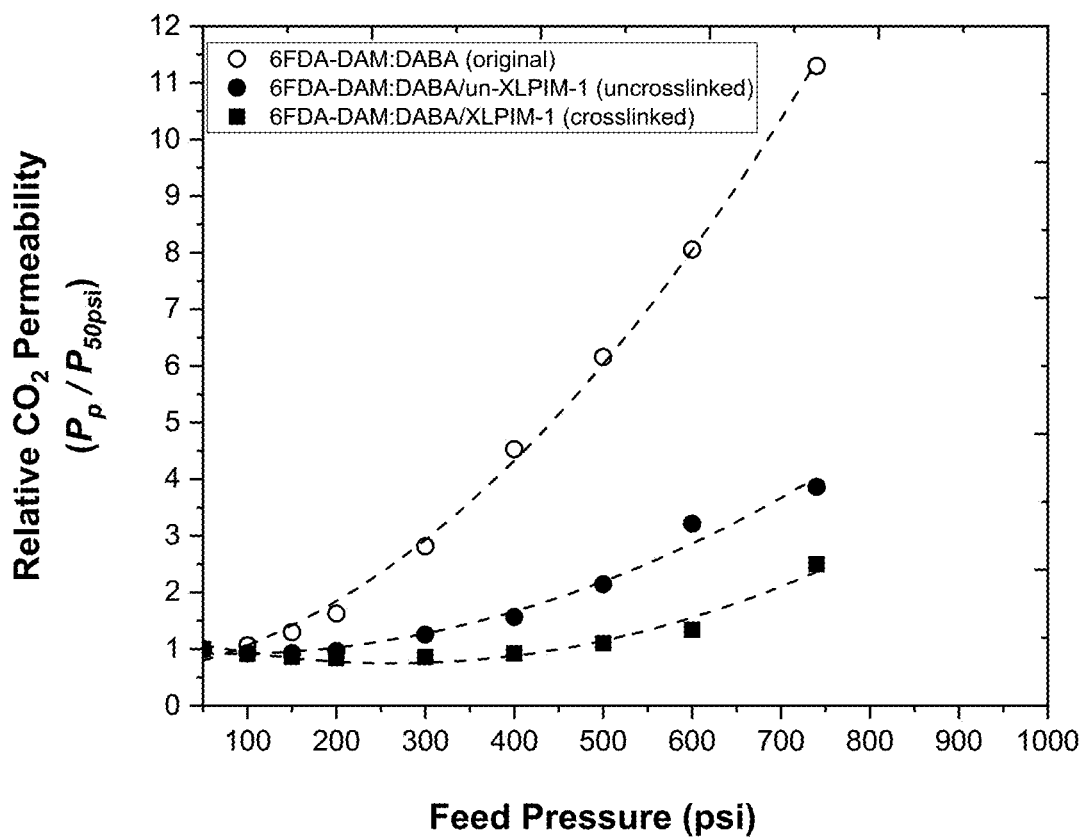
FIG. 13 is a graph showing a comparison of relative $CO_2$ permeability for a neat 6FDA-DAM:DABA membrane (open circle), a 6FDA-DAM:DABA/un-XLPIM-1 (uncrosslinked) blended membrane (solid circle), and a 6FDA-DAM:DABA/XLPIM-1 (crosslinked) blended membrane (solid square) vs. $CO_2$ feed pressure tested under single gas at 25° C.

To study the effect of blending and crosslinking of PIM-1 on $CO_2$ plasticization resistance of the 6FDA-DAM:DABA membrane, pure $CO_2$ permeation experiments were performed at increasing $CO_2$ feed pressure up to 800 psi. A substantial increase in $CO_2$ permeability is an indicator of plasticization. The change of $CO_2$ relative permeability ($P_p/P_{po}$) with the increase of the applied $CO_2$ pressure at 25° C. was calculated. As can be seen in FIG. 13, the comparative 6FDA-DAM:DABA membrane exhibited a 516% increase in $CO_2$ permeability at 500 psi compared to that at 50 psi. When the applied $CO_2$ feed pressure increased to 740 psi, the comparative 6FDA-DAM:DABA membrane exhibited a 1030% increase in $CO_2$ permeability. The significant $CO_2$ permeability increase when the applied $CO_2$ feed pressure was increased was due to the $CO_2$ plasticization (or swelling).

By blending and chemically crosslinking PIM-1 material using PEG-bisazide as a crosslinker at high temperature in a vacuum oven, no plasticization was observed in the blended membranes prepared according to Example 2 up to 300-400 psi $CO_2$ feed pressure. For example, the 6FDA-DAM:DABA/XLPIM-1 (crosslinked) blended membrane showed only 10% and 30% increase in $CO_2$ permeability at 500 psi and 600 psi, respectively, compared to that at 50 psi. Even when the $CO_2$ feed pressure was increased to 740 psi, only a 150% increase in $CO_2$ permeability was observed for this blended membrane. The significant enhancement in $CO_2$ plasticization resistance for the 6FDA-DAM:DABA/XLPIM-1 (crosslinked) blended membrane as compared to the comparative 6FDA-DAM: DABA membrane can be attributed to the chemical crosslinking and formation of rigid covalently interpolymer-chain-connected cross-linked networks inside of the membrane matrix.

Figure 14:
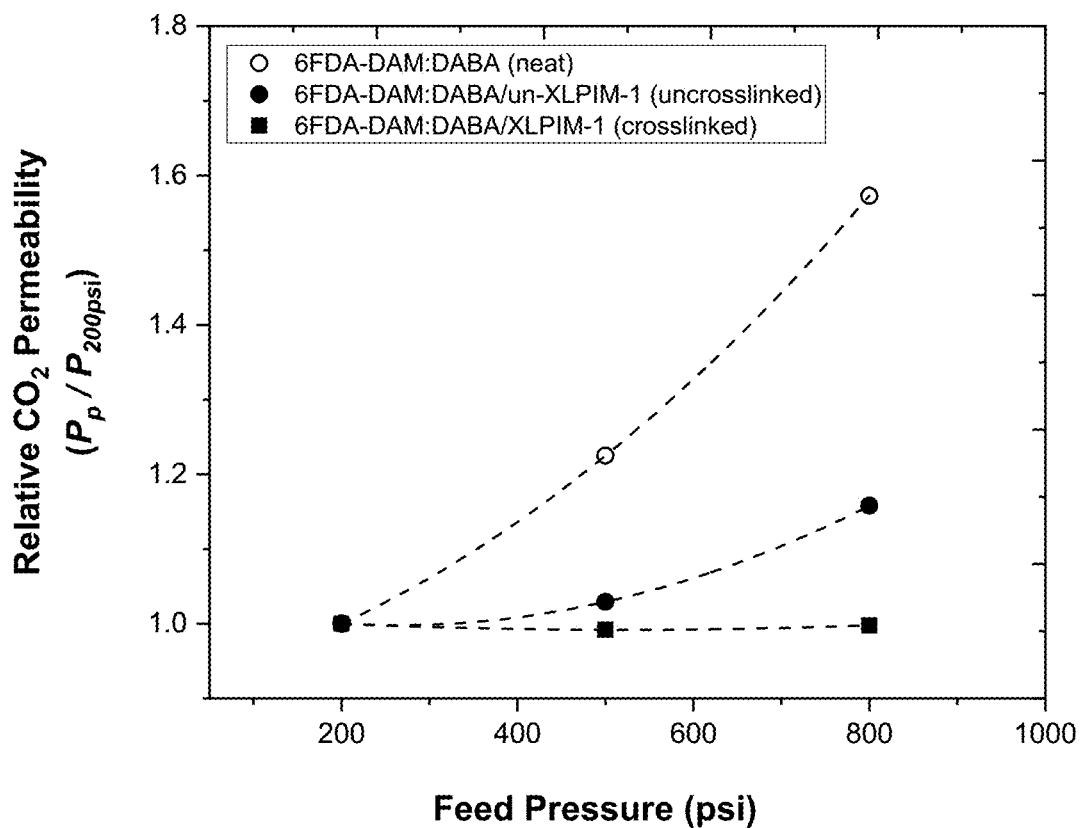
FIG. 14 is a graph showing a comparison of relative $CO_2$ permeability with a neat 6FDA-DAM:DABA membrane (open circle), a 6FDA-DAM:DABA/un-XLPIM-1 (uncrosslinked) blended membrane (solid circle), and a 6FDA-DAM:DABA/XLPIM-1 (crosslinked) blended membrane (solid square) vs. $CO_2$ feed pressure tested under a binary gas mixture (20% $CO_2$/80% $CH_4$) at 25° C.

To contrast the plasticization resistance of the 6FDA-DAM:DABA/XLPIM-1 (crosslinked) blended membranes, a 6FDA-DAM:DABA/un-XLPIM-1 (uncrosslinked) blended membrane was tested under the same conditions. The results showed that the uncrosslinked blended membrane had higher $CO_2$ plasticization than that of the 6FDA-DAM:DABA/XLPIM-1 (crosslinked) blended membrane, but better $CO_2$ plasticization resistance compared to the comparative 6FDA-DAM:DABA membrane. Furthermore, the plasticization resistance of the blended membranes was studied under mixed gas conditions, and the results further demonstrated that the 6FDA-DAM:DABA/XLPIM-1 (crosslinked) blended membranes exhibited excellent $CO_2$ plasticization resistance, and no plasticization was observed up to 800 psi $CO_2$ feed pressure (FIG. 14).

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A blended polymeric membrane comprising:
a co-polyimide polymeric membrane matrix;
a polymer of intrinsic microporosity (PIM); and
a polyethylene glycol-bisazide (PEG-bisazide) crosslinking agent having an average molecular weight (Mn) of about 200 to about 40,000,
wherein the PIM is crosslinked with the PEG-bisazide crosslinking agent.

2. The blended polymeric membrane of claim 1, wherein the co-polyimide polymeric membrane matrix comprises a 4,4'-(hexafluoroisopropylidene) diphthalic anhydride (6FDA)-based polyimide.

3. The blended polymeric membrane of claim 2, wherein the 6FDA-based polyimide has an average molecular weight (Mn) of about 150,000 to about 230,000.

4. The blended polymeric membrane of claim 2, wherein the 6FDA-based polyimide is 6FDA-DAM: DABA.

5. The blended polymeric membrane of claim 4, wherein the 6FDA-based polyimide is 6FDA-DAM: DABA (3:2).

6. The blended polymeric membrane of claim 1, wherein the PIM is PIM-1.

7. The blended polymeric membrane of claim 1, wherein the PIM has an average molecular weight (Mn) of about 70,000 to about 100,000.

8. The blended polymeric membrane of claim 1, wherein the PEG-bisazide crosslinking agent has an average molecular weight (Mn) of about 600 to about 2,000.

9. The blended polymeric membrane of claim 1, wherein the PEG-bisazide crosslinking agent has an average molecular weight (Mn) of about 1100.

10. The blended polymeric membrane of claim 1, wherein the crosslinked PIM is blended with the co-polyimide polymeric membrane matrix.

11. The blended polymeric membrane of claim 1, wherein the membrane demonstrates enhanced $CO_2$ plasticization resistance up to 800 psi $CO_2$ feed pressure as compared to the same blended polymeric membrane that does not incorporate a PIM crosslinked with a PEG-bisazide crosslinking agent.

12. The blended polymeric membrane of claim 1, wherein the membrane exhibits a $CO_2$-permeability increase of about 10% to about 100% as compared to the same blended polymeric membrane that does not incorporate a PIM crosslinked with a PEG crosslinking agent.

13. The blended polymeric membrane of claim 1, wherein the membrane exhibits a $CO_2/CH_4$ selectivity increase of about 10% to about 100% as compared to the same blended polymeric membrane that does not incorporate a PIM crosslinked with a PEG crosslinking agent.

14. The blended polymeric membrane of claim 1, wherein the membrane exhibits a $CO_2/CH_4$ single gas selectivity ($\alpha CO_2/CH_4$) of about 50 to about 60 when tested at feed temperature of 25° C. and feed pressure of 800 psi.

* * * * *

UNITED STATES PATENT AND TRADEMARK OFFICE
CERTIFICATE OF CORRECTION

PATENT NO. : 12,179,157 B2  
APPLICATION NO. : 17/513510  
DATED : December 31, 2024  
INVENTOR(S) : Junyan Yang Page 1 of 1

It is certified that error appears in the above-identified patent and that said Letters Patent is hereby corrected as shown below:

In the Claims

In Column 25, Line 17, Claim 12, please replace "PEG" with -- PEG-bisazide --.

In Column 25, Line 22, Claim 13, please replace "PEG" with -- PEG-bisazide --.

Signed and Sealed this  
Eighteenth Day of February, 2025

Coke Morgan Stewart  
*Acting Director of the United States Patent and Trademark Office*